(12) United States Patent
Tasker

(10) Patent No.: US 7,068,594 B1
(45) Date of Patent: Jun. 27, 2006

(54) METHOD AND APPARATUS FOR FAULT TOLERANT PERMANENT VOICE CALLS IN VOICE-OVER-PACKET SYSTEMS

(75) Inventor: Michael Tasker, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/258,674

(22) Filed: Feb. 26, 1999

(51) Int. Cl.
*H04J 1/16* (2006.01)
*H04J 3/14* (2006.01)

(52) U.S. Cl. .................. 370/217; 370/221; 370/225; 370/254; 370/351; 370/400

(58) Field of Classification Search .............. 370/217, 370/218, 219, 220, 221, 254, 351, 395.32, 370/396, 400, 401, 408, 225, 255
See application file for complete search history.

(56) References Cited

U.S. PATENT DOCUMENTS

| | | | |
|---|---|---|---|
| 4,623,760 A | 11/1986 | Binkerd et al. | 379/232 |
| 4,747,130 A | 5/1988 | Ho | 379/269 |
| 4,862,452 A | 8/1989 | Milton et al. | 370/263 |
| 4,955,054 A | 9/1990 | Boyd, Jr. et al. | 379/269 |
| 4,958,341 A * | 9/1990 | Hemmady et al. | 370/352 |
| 4,991,169 A | 2/1991 | Davis et al. | 370/463 |
| 5,150,357 A | 9/1992 | Hopner | 370/354 |
| 5,224,099 A | 6/1993 | Corbalis et al. | 370/412 |
| 5,305,308 A | 4/1994 | English et al. | 370/335 |
| 5,313,454 A | 5/1994 | Bustini et al. | 370/231 |
| 5,329,579 A | 7/1994 | Brunson | 379/88.26 |
| 5,359,592 A | 10/1994 | Corbalis et al. | 370/233 |
| 5,410,599 A | 4/1995 | Crowley et al. | 380/269 |
| 5,434,981 A | 7/1995 | Lenihan et al. | 718/100 |
| 5,442,789 A | 8/1995 | Baker et al. | 718/105 |
| 5,497,373 A | 3/1996 | Hulen et al. | 370/259 |
| 5,515,363 A | 5/1996 | Ben-Nun et al. | 370/232 |
| 5,526,344 A | 6/1996 | Diaz et al. | 370/364 |

(Continued)

OTHER PUBLICATIONS

Doug O'Leary, "Frame Relay/ATM PVC Service Interworking Implementation Agreement," Frame Relay Forum, pp. 1-24, Apr. 14, 1995.

(Continued)

*Primary Examiner*—Dang Ton
*Assistant Examiner*—Inder Pal Mehra
(74) *Attorney, Agent, or Firm*—Blakely, Sokoloff, Taylor & Zafman LLP

(57) ABSTRACT

A Multiservice Access Concentrator (MAC) is provided that provides fault tolerant permanent voice calls in a voice over packet-data-network system (VOPS). The MAC sets up at least one permanent voice call by coupling a number of nodes in series using a voice-over-packet protocol and a set of primary connection bindings. Furthermore, at least one set of alternate connection bindings are defined for the permanent voice call. At least one preference-based list is generated comprising the sets of alternate connection bindings. Each node operating with the voice-over-packet protocol is capable of determining at least one out-of-service state for the node. A failure of at least one of the series nodes is detected by the node. A reconnection relationship is established between nodes on either side of a node determined to be out of service. The permanent voice call connection is automatically re-established or reconnected using at least one alternate node. The permanent voice call of an embodiment is transmitted over a Frame Relay network in accordance with a standard comprising a Frame Relay Forum FRF.11 Implementation Agreement.

65 Claims, 21 Drawing Sheets

U.S. PATENT DOCUMENTS

| | | | |
|---|---|---|---|
| 5,528,595 A | 6/1996 | Walsh et al. | 370/402 |
| 5,561,663 A | 10/1996 | Klausmeier | 370/468 |
| 5,594,727 A | 1/1997 | Kolbenson et al. | 370/442 |
| 5,602,848 A | 2/1997 | Andrews et al. | 370/465 |
| 5,615,211 A | 3/1997 | Santore et al. | 370/419 |
| 5,623,491 A | 4/1997 | Skoog | 370/397 |
| 5,719,865 A | 2/1998 | Sato | 370/230.1 |
| 5,724,513 A | 3/1998 | Ben-Nun et al. | 709/234 |
| 5,734,656 A | 3/1998 | Prince et al. | 370/401 |
| 5,742,596 A | 4/1998 | Baratz et al. | 370/356 |
| 5,745,490 A | 4/1998 | Ghufran et al. | 370/397 |
| 5,765,032 A | 6/1998 | Valizadeh | 709/235 |
| 5,771,232 A | 6/1998 | Sinibaldi et al. | 370/384 |
| 5,793,747 A | 8/1998 | Kline | 370/230 |
| 5,793,858 A | 8/1998 | Meubus et al. | 379/211.01 |
| 5,812,541 A | 9/1998 | Fuentes et al. | 370/335 |
| 5,835,494 A | 11/1998 | Hughes et al. | 370/397 |
| 5,838,994 A | 11/1998 | Valizadeh | 710/56 |
| 5,862,211 A | 1/1999 | Roush | 379/309 |
| 5,883,804 A | 3/1999 | Christensen | 700/94 |
| 5,894,477 A | 4/1999 | Brueckheimer et al. | 370/353 |
| 5,940,479 A | 8/1999 | Guy et al. | 379/93.01 |
| 5,970,066 A | 10/1999 | Lowry et al. | 370/353 |
| 5,974,033 A | 10/1999 | Kamiya et al. | 370/230.1 |
| 6,002,666 A | 12/1999 | Fukano | 370/230.1 |
| 6,005,868 A | 12/1999 | Ito | 370/413 |
| 6,009,507 A | 12/1999 | Brooks et al. | 712/28 |
| 6,011,780 A | 1/2000 | Vaman et al. | 370/237 |
| 6,028,858 A | 2/2000 | Rivers et al. | 370/352 |
| 6,052,375 A | 4/2000 | Bass et al. | 370/412 |
| 6,058,117 A | 5/2000 | Ennamorato et al. | 370/442 |
| 6,104,721 A | 8/2000 | Hsu | 370/431 |
| 6,118,864 A | 9/2000 | Chang et al. | 379/225 |
| 6,144,637 A | 11/2000 | Calvignac et al. | 370/229 |
| 6,169,750 B1 | 1/2001 | Tomono et al. | 370/474 |
| 6,181,694 B1 | 1/2001 | Pickett | 370/353 |
| 6,208,627 B1 | 3/2001 | Menon et al. | 370/328 |
| 6,226,342 B1 | 5/2001 | Stacey et al. | 376/441 |
| 6,272,109 B1 | 8/2001 | Pei et al. | 370/230 |
| 6,301,339 B1 | 10/2001 | Staples et al. | 379/93.1 |
| 6,311,288 B1 | 10/2001 | Heeren et al. | 370/217 |
| 6,400,681 B1 * | 6/2002 | Bertin et al. | 370/218 |
| 6,535,505 B1 | 3/2003 | Hwang et al. | 370/352 |
| 6,560,196 B1 | 5/2003 | Wei | 370/230.1 |
| 6,584,108 B1 | 6/2003 | Chung et al. | 370/401 |
| 6,611,531 B1 | 8/2003 | Chen et al. | 370/458 |
| 6,657,970 B1 * | 12/2003 | Buckingham et al. | 370/249 |
| 6,763,017 B1 | 7/2004 | Buckingham et al. | 370/352 |

OTHER PUBLICATIONS

Gary Lee, et al., "A Mangement Briefing on Frames to Cells, Frame Relay and Frame UNI in ATM Networks," General DataComm, pp. 1-12 (1997).

Addison Ching, "CEDPA Launches Discussion Lists", Oct.-Nov. 1997, The DataBus, vol. 37, No. 6, pp. 1-10 (Huntington Beach, CA, Oct.-Nov. 1997).

B. Thompson, et al., "DSP Resource Manager Interface and its Role in DSP Multimedia," IEEE, pp. 291-298, 1994.

Edward B. Morgan, "Voice Over Packet, White Paper," Telogy Networks, pp. 1-13, 1997.

S. Mangiapane, "Cisco Announces MC3810 Multiservice Access Concentrator," The Databus, vol. 37, No. 6, pp. 1-3, Oct.-Nov. 1997.

"Voice Over Frame Relay Implementation Agreement, FRF 11.1," Frame Realy Forum Technical Committee, pp. I-vi and 1-46 (Revision History: FRF.11 May 1997; FRF. 11.1 Annex J Added Dec. 1998).

"Annex B to Voice Over Frame Relay Implementation Agreement, FRF .11," Frame Relay Forum Technical Committee, pp. B-1 & B-2 (May 1997).

R. Iyer & Cisco Systems, "A TDM Interface for the TMS320C54X DSP, Application Report: SPRA453," Digital Signal Processing Solutions (Texas Instruments Jun. 1998).

Erwin P. Rathgeb, et al., "The MainStreetXpress Core Services Node-A Versatile ATM Switch Architecture for the Full Service Network," IEEE Journal on Selected Areas in Communications, vol. 15, No. 5, pp. 795-806 (Jun. 1997).

* cited by examiner

METHOD AND APPARATUS FOR FAULT TOLERANT PERMANENT VOICE CALLS IN VOICE-OVER-PACKET SYSTEMS

FIELD OF THE INVENTION

The present invention relates generally to the routing of information across networks and, more particularly, to the implementation of permanent voice calls between private branch exchanges via voice-over-packet network systems.

BACKGROUND OF THE INVENTION

Until recently there has persisted a fundamental dichotomy between two main types of telecommunication networks. The first type of telecommunication network, the telephone network, switches and transports predominantly voice, facsimile, and modulation-demodulation system (modem) traffic. The public switched telephone network (PSTN) is an example of this type of network. Telephone networks are also deployed privately within organizations such as corporations, banks, campuses, and government offices. The second type of telecommunication network, the data network, switches or routes and transports data and video between computers. The Internet is an example of a public data network; data networks may be privately deployed.

Telephone networks were developed and deployed earlier, followed by data networks. Telephone network infrastructures are ubiquitous, however, and as a result data networks typically are built, to a limited extent, using some components of telephone networks. For example, the end user access link to a data network in some cases is implemented with a dial-up telephone line. The dial-up telephone line thus connects the end user computer equipment to the data network access gateway. Also, high speed digital trunks interconnecting remote switches and routers of a data network are often leased from telephone long-haul carriers.

Nonetheless, telephone and data network infrastructures were typically deployed together with limited sharing of resources, especially with regards to the core components of the networks—the switches and routers that steer the payloads throughout the networks. Furthermore, multiservice network switches are used to provide a data path, or interface, between multiple networks, each of which may operate using a different type of data or according to a different networking standard protocol. Examples of the networking protocols supported by these multiservice switches include, but are not limited to, frame relay, voice, circuit emulation, T1 channelized, E1 channelized, and Asynchronous Transfer Mode (ATM). The cost of this redundancy coupled with advances in data network technology has led, where possible, to integrated network traffic comprising voice, data, facsimile, and modem information over a unified data network. As such, a network should now be able to accept, service, integrate, and deliver multiple types of data over its access links on a random, dynamic basis using a minimum set of hardware on a single platform. This is typically accomplished using network routers, or concentrators, that provide for dynamic allocation of network resources among the received channels of information on an as-needed basis, wherein the cost, size, and complexity of the router is reduced by minimizing the duplication of resources among router channels.

Typically, voice over data networks comprise the application of voice digitization and compression schemes to enable voice to be transported on networks originally developed to transport data. In providing integrated network traffic comprising voice information, voice over data networks represent a development intended to satisfy the necessity to integrate the transportation of voice and data in a cost-effective manner through equipment whose installation and operation limits potential disruption to ongoing organizational activities. Consequently, reliability is a major concern for organizations implementing voice over data networks.

Voice calls over packet networks are typically defined as either switched calls or permanent calls. In a switched call, the user enters a telephone number to select a call destination. In a permanent call, the end destination is fixed. Permanent calls are typically used to provide tie-line emulation for a connection between two telephone switches, for example, tie-line connections between central office facilities and branch or remote office facilities. Reliability of permanent tie-lines is of major concern because the tie-line is often relied on to provide instantaneous access between corporate facilities. As such, a failure of the equipment comprising a voice over data network may isolate corporate facilities. Therefore, there is a desire, when implementing permanent voice calls for tie-line replacements using voice over packet networks, to provide fault tolerance such that from the perspective of the external telephone equipment, the permanent voice connections provided are really permanent and reliable.

Two network types that are typically used to provide voice calls over packet networks are Internet Protocol (IP) and Frame Relay networks. Both IP and Frame Relay networks represent packet-shared networks for which bandwidth is consumed only when transmission occurs. The Frame Relay Forum has developed an Implementation Agreement, FRF.11, that defines the methods for providing voice over Frame Relay networks. While the FRF.11 protocol specification covers the formatting and transmission of packets over Frame Relay networks, it fails to deal with network configuration issues related to setting up and tearing down permanent connections, forwarding voice packets between FRF.11 call segments, and providing for multiple network routes or destinations. Consequently, there is a desire, relating to the reliability of permanent voice calls, to provide reliable permanent voice calls using FRF.11 voice links without modification of the FRF.11 format packets.

SUMMARY AND OBJECTS OF THE INVENTION

It is therefore an object of the invention to provide permanent and reliable permanent tie-line voice calls over packet-based or cell-based multiservice networks comprising Frame Relay, Asynchronous Transfer Mode (ATM), High-level Data Link Control (HDLC), Internet Protocol (IP), and Time Division Multiplexed (TDM) networks.

It is a further object of the invention to provide fault tolerant permanent voice calls via voice-over Frame Relay networks using Frame Relay Forum FRF.11 Implementation Agreement protocol.

These and other objects of the invention are provided by a Multiservice Access Concentrator (MAC) that provides fault tolerant permanent voice calls in a voice over packet-data-network system (VOPS). The MAC of an embodiment sets up at least one permanent voice call by coupling a number of nodes in series using a voice-over-packet protocol. The nodes comprise end-point nodes and intermediate nodes, but the embodiment is not so limited. A failure of at least one of the series nodes is detected by the node. The permanent voice call connection is automatically re-established using at least one alternate node. The permanent voice call of an embodiment is transmitted over a Frame Relay network in accordance with a standard comprising a Frame Relay Forum FRF.11 Implementation Agreement.

In providing fault tolerant permanent voice calls in a VOPS, at least one set of primary connection bindings are defined for a permanent voice call between a first and a second port. Furthermore, at least one set of alternate connection bindings are defined for the permanent voice call. The elements of the set of primary connection bindings may overlap with elements of the set of alternate connection bindings. At least one preference-based list is generated comprising the at least one set of alternate connection bindings. Each node operating with the FRF.11 protocol is capable of determining at least one out-of-service state for the node. A reconnection relationship is established between nodes on either side of a node determined to be out-of-service, and the permanent voice call is reconnected using one of the set of alternate connection bindings.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
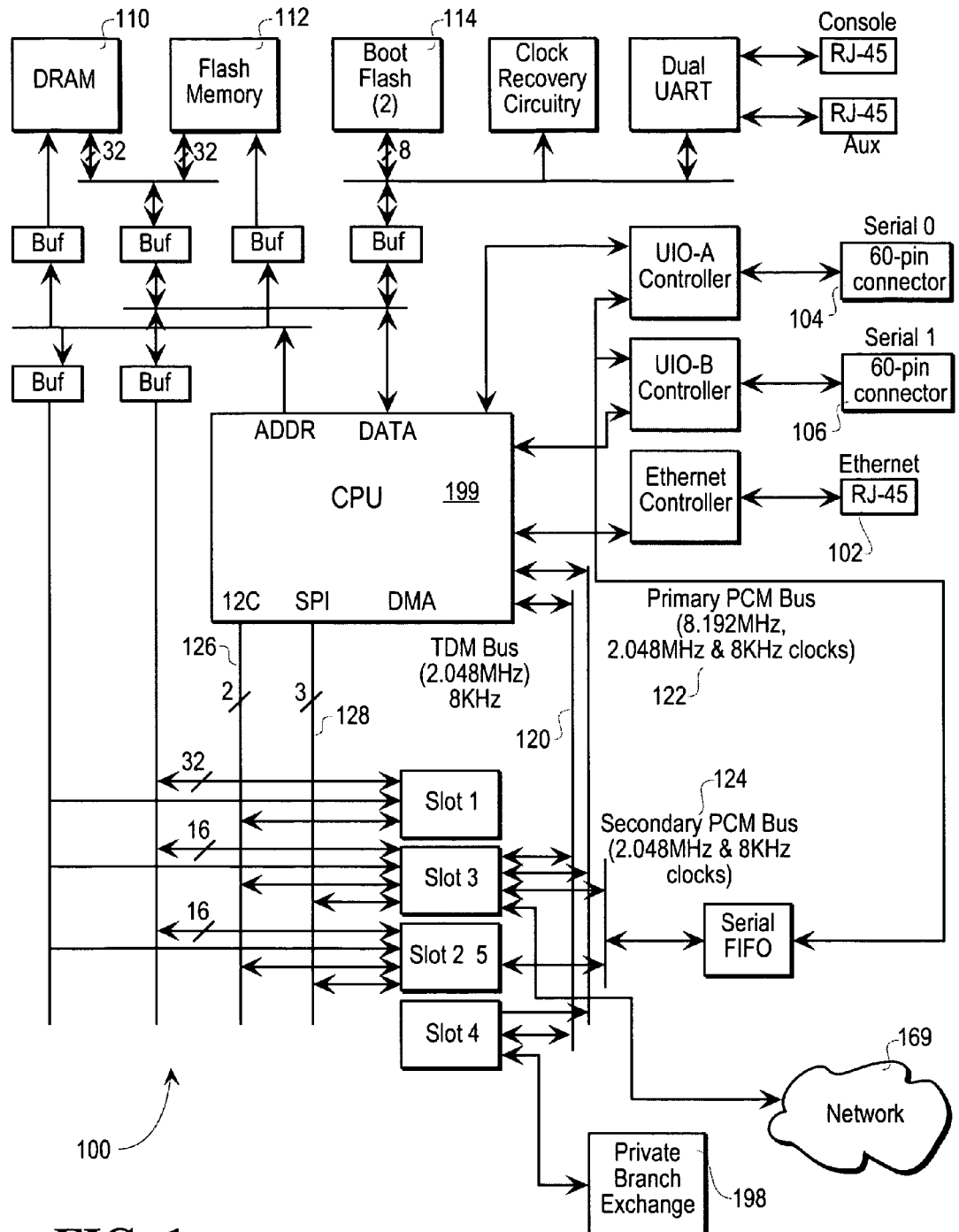
FIG. 1 is a system block diagram of a Multiservice Access Concentrator (MAC) of an embodiment of the present invention for routing integrated data, voice, and video traffic.

FIG. 1 is a system block diagram of a Multiservice Access Concentrator (MAC) 100 of an embodiment of the present invention for routing integrated data, voice, and video traffic. The MAC 100 of an embodiment is a compact, low-cost multi-service access device that integrates local area network (LAN), synchronous data, voice, video and facsimile traffic for transport over a network system 169 comprising public and private Frame Relay, asynchronous transfer mode (ATM), synchronous transfer mode, bisynchronous transfer mode, and time division multiplexed (TDM) networks. Multi-protocol routing is combined with voice, but the embodiment is not so limited. The video support of the MAC of an embodiment comprises transport over ATM, Frame Relay, and TDM circuits. The MAC uses a software-configurable wide area network (WAN) trunk to seamlessly integrate data, voice, and video into existing networks using common switch and network hardware, and without reconfiguring the network switch hardware, but the embodiment is not so limited.

The MAC of an embodiment provides capabilities comprising, but not limited to ATM or Frame Relay technology over T1/E1, Circuit Emulation Service (CES) for video, packetized voice over ATM, Frame Relay, and Internet Protocol (IP), voice compression, and telephony capabilities. The MAC of an embodiment has the processing power to meet the demands of an ATM access device, and can multiplex voice, video, and data applications onto trunks running at speeds from 56/64 kbps to E1, but the embodiment is not so limited.

The software architecture of the MAC of an embodiment is a modular design which may be used in a distributed environment, but the embodiment is not so limited. The MAC uses an internetwork software operating system that provides kernel services, network services and routing capability, but the embodiment is not so limited. The interface ports of the MAC of an embodiment comprise a single Ethernet port 102, two serial ports 104–106 that support speeds up to 2 Mbps, and either six analog voice ports or a single digital voice access port (T1/E1), but the embodiment is not so limited. The analog voice port configuration provides up to six uncompressed or compressed voice channels, while the digital voice port configuration provides up to 24 compressed voice channels, but the embodiment is not so limited. As many as 30 channels are available for passing voice channels via TDM channels, but the embodiment is not so limited. Furthermore, combinations of compressed and PCM voice are available.

The MAC of an embodiment provides a 10BaseT Ethernet port or two universal input/output (UIO) serial ports to provide data and video, and route it to the proper destination using a wide area network (WAN) trunk, but the embodiment is not so limited. The UIO supports connectivity to a digital carrier service at a number of clock rates. There are two UIO serial ports, serial 0 and serial 1. Serial 0 receives timing data, or clock data, and distributes it to serial 1. Consequently, serial 0 should be used as a network trunk port, but the embodiment is not so limited. Furthermore, the UIO port receives video traffic. Following circuit emulation, the video traffic is transported using the WAN trunk. The MAC supports analog voice streams using Ear and Mouth (E&M) (2 wire and 4 wire with immediate dial, delay dial and wink start), Foreign Exchange Station (FXS) (ground start and loop start), and Foreign Exchange Office (FXO) (ground start and loop start) voice signal standards. Furthermore, the MAC supports digital voice streams using T1/E1/UIO interfaces. The MAC receives the voice traffic from these ports and implements a voice compression algorithm, but the embodiment is not so limited. Moreover, echo cancellation is also implemented to improve the quality, wherein 8 to 32 millisecond echo tails are accommodated, but the embodiment is not so limited. The compressed voice is packetized and transported over the WAN trunk. The WAN trunk access of an embodiment is through either a T1/E1 access card or a UIO port that supports ATM (T1/E1 trunk), Frame Relay, and HDLC networks.

Figure 2:
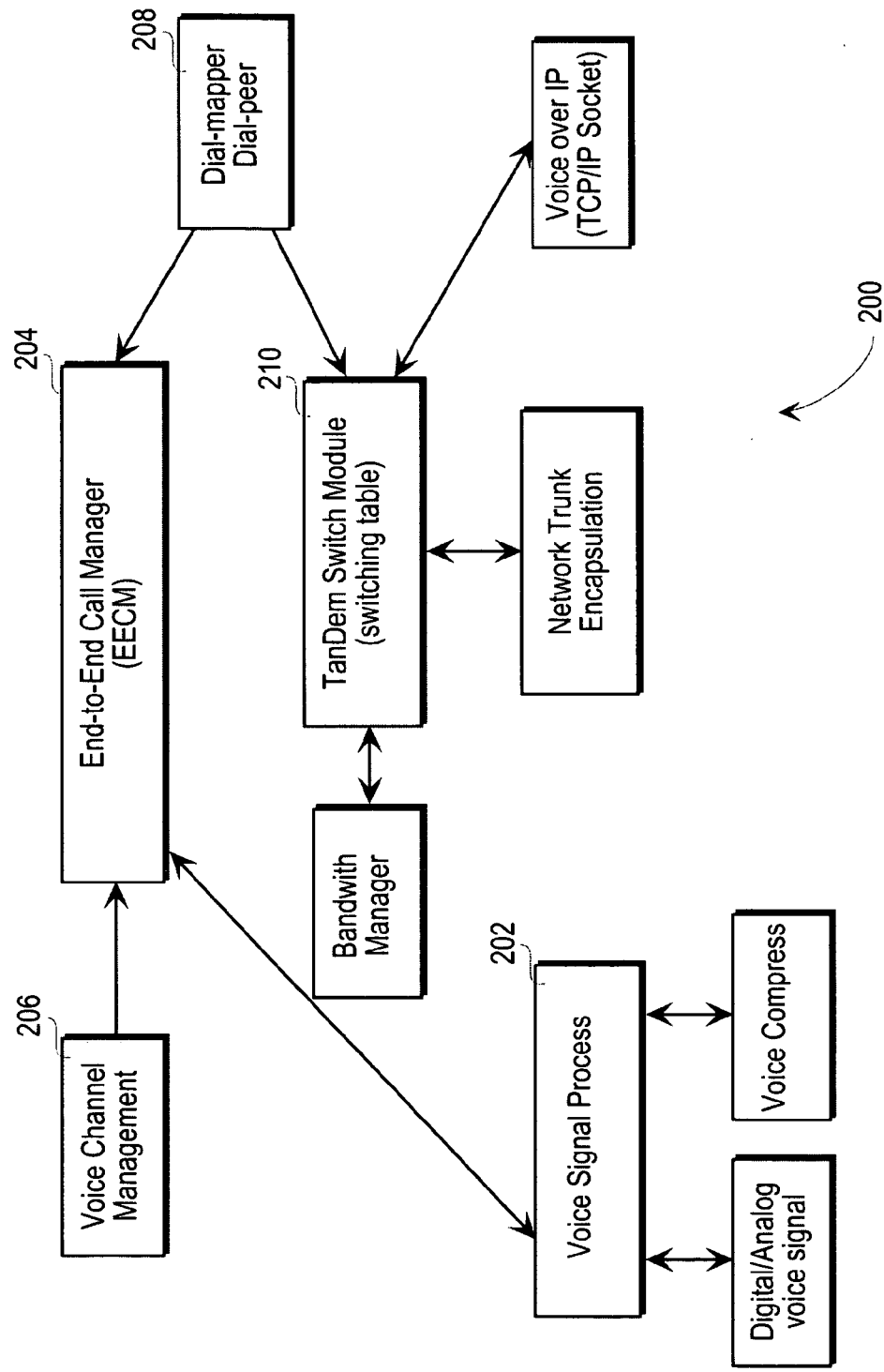
FIG. 2 is a voice processing subsystem of a MAC of an embodiment of the present invention.

FIG. 2 is a voice processing subsystem 200 of a MAC of an embodiment of the present invention. The internetwork software operating system that provides kernel services, network services and routing capability comprises the voice processing subsystem 200, but the embodiment is not so limited. In operation, an analog voice port or digital voice port provides a voice signal to the Voice Signal Process module 202. The Voice Signal Process module 202 translates the voice signal to a call setup message. The call setup message is sent to the End-to-End Call Manager (EECM) 204, wherein a call setup procedure is initiated. The call setup procedure comprises calling the Voice Channel Manager 206 to allocate a DSP for connection to the receiving voice port via the PCM bus. Furthermore, the call setup procedure signals the Voice Signal Process module 202 to enable the allocated DSP to start the DTMF sampling for the dialing digits. Upon collection of enough digits by consulting the dial-mapper 208, a setup message is provided to the Tandem Switch Module 210. The Tandem Switch Module 210, using the Dial-peer and Dial-mapper 208, locates the permanent virtual connection (PVC) number of the remote extension in order to provide a setup message.

With reference to FIG. 1, the interface ports of the MAC 100 are coupled to a central processing unit (CPU) 199, but the embodiment is not so limited. Multiple memory devices 110–114 are coupled to the CPU 199 of one embodiment, wherein dynamic random access memory (DRAM) 110 is supported in 4, 8, 16, and 32 Mb single inline memory modules (SIMMs) and flash memory 112–114, or nonvolatile memory, is supported in 4, 8, and 16 Mb memory devices, but the embodiment is not so limited. A 32-bit SIMM socket supports up to 64-Mbyte of program memory and data storage memory 110. A 32-bit SIMM socket supports up to 32-Mbyte of flash memory 112. Furthermore, a 512-Kbyte boot flash 114 is provided, but the embodiment is not so limited. Moreover, a 2-Mbyte on-board flash memory 112 supports system configuration.

The MAC of an embodiment comprises five option slots coupled to the CPU 199, but the embodiment is not so limited. The option slots provide expanded services for voice and data using plug-in modules (PIMs), but are not so limited. The plug-in modules supported in an embodiment comprise a multi-flex trunk module (MTM), a voice compression module (VCM), an analog voice module (AVM), a digital voice module (DVM), and a data compression/encryption module (DCM), but the embodiment is not so limited.

The MAC of an embodiment comprises a bus system that couples the resources of the MAC. The bus system comprises a host bus, a system memory bus, an extended auxiliary bus, a plug-in module slot bus, a PCM bus, an I-square bus, and an SPI bus, but the embodiment is not so limited. The buses of an embodiment are coupled to the CPU directly or to the host bus using buffers. A bus controller maintains control of the buffers for each bus transaction. The bus controller of one embodiment is implemented using field programmable gate arrays (FPGAs), but the embodiment is not so limited.

As discussed herein, and with reference to FIG. 1, the MAC of an embodiment comprises five plug-in module (PIM) slots. The PIM slot bus provides the signals among the CPU 199 and each of these slots. Each of the slots share common signals including bus transaction control, data and address, and voltage and return ground signals.

The MAC 100 of an embodiment comprises three PCM buses 120–124, but the embodiment is not so limited. The PCM bus signals comprise an 8K frame sync pulse mark, 2.048 MHz clock, 8 MHz clock, transmit data, and receive data, but the embodiment is not so limited.

The first PCM bus is a TDM bus 120 between the CPU 199 and PIM slots 3 and 4 that provides a dedicated serial connection between the CPU 199 and the MTM. The second PCM bus is the primary PCM bus 122 that couples the CPU 199 among PIM slots 2, 3, 4, and 5. The primary PCM bus 122 is used among the AVM, VCM, DVM, DCM, and CPU for voice applications. For example, after the analog voice signal is converted into 8-bit PCM data by a coder/decoder (codec) on the AVM, it can be mapped into one of 32 time slots of this PCM bus, but the embodiment is not so limited. Then the VCM can be programmed to pick up the PCM data from this time slot and compress it to 8 Kbps data.

The third PCM bus is the secondary PCM bus 124 that couples PIM slots 2, 3, and 5 to a UIO port 104. The secondary PCM bus 124 is used for mapping Nx64 Kbps data from UIO ports to any time slot on the trunk line in the MTM on PIM slot, but the embodiment is not so limited.

The MAC of an embodiment supports an MTM PIM. The MTM is the option module which provides users with a software-configurable T1/E1 trunk capability having built-in, long-haul Channel Service Unit (CSU)/short-haul Data Service Unit (DSU), wherein common hardware supports the software-configurable trunk. The MTM may be coupled to Frame Relay, ATM, or leased-line carrier services. When the MTM is present in the MAC, the MAC supports either packet or circuit switch applications. As such, the MTM supports ATM, Frame Relay, and serial link protocols as the network encapsulation. The line coded T1/E1 data is converted to 2.048 Mbps PCM data by an on-board framer; this framer extracts the clock from the received data, and the timing information is distributed to the UIOs and DVM. An Integrated Services Digital Network (ISDN) port provides a network back-up connection when the T1/E1 trunk is down, but the embodiment is not so limited. When the MTM is not present in the MAC, the MAC uses a UIO as the network trunk, wherein the MAC supports HDLC for Frame Relay protocol or serial link protocol.

The MAC of an embodiment comprises two PIMs that are used for network access, the DVM and AVM. The DVM, functionally equivalent to the MTM, provides connectivity to a digital private branch exchange 198 or channel bank. The voice channels can be either mapped to time slots on the primary PCM bus for voice compression or mapped to time slots on another PCM bus through a cross-connect switch.

The AVM of an embodiment supports telephone signaling interfaces comprising FXS, FXO and E&M, but the embodiment is not so limited. The AVM provides up to six analog voice ports in any combination of these interfaces, wherein the analog voice ports provide coupling between the MAC and a Key Telephone System (KTS) or even directly to a phone set. There is one sub-module for each interface that resides on the AVM. Furthermore, the AVM provides the standard telecommunication interface voltages. The on-board codecs are used to provide the analog-to-digital and digital-to-analog functions to interface the analog voice system to the PCM sub-system.

The MAC of an embodiment supports ATM, Frame Relay, HDLC, and TDM trunk services. As such, the T1/E1 network trunk port hardware of the MAC of an embodiment can be configured using software to support three modes, but the embodiment is not so limited. The supported modes comprise: whole T1/E1 pipe running either ATM or HDLC (Frame Relay) data format; fractional T1/E1 running HDLC for Frame Relay only; and, fractional T1/E1 running HDLC for Frame Relay and some channels running TDM traffic. A TDM channel may be configured for use in video and voice applications. The video traffic is received from one of the UIO ports while the voice traffic is received from the UIO/Fractional T1/E1 Access port or from the Analog Voice Module, but the embodiment is not so limited. The TDM trunk provides channel-bank functionality not found in typical data access devices. The TDM capability provides greater flexibility in application support and reduces access charges by allowing multiple applications to use the same access trunk. For example, a group of time slots on the trunk may be allocated to Frame Relay, while others may be used for private branch exchange trunks, and still others may be allocated for video conferencing.

Furthermore, the MAC of an embodiment is software configurable for Frame Relay and ATM access. Voice, facsimile, and data are transported over ATM using a variable bit rate or a constant bit rate, but the embodiment is not so limited. Both structured and unstructured constant bit rate support is provided for video traffic.

Figure 3:
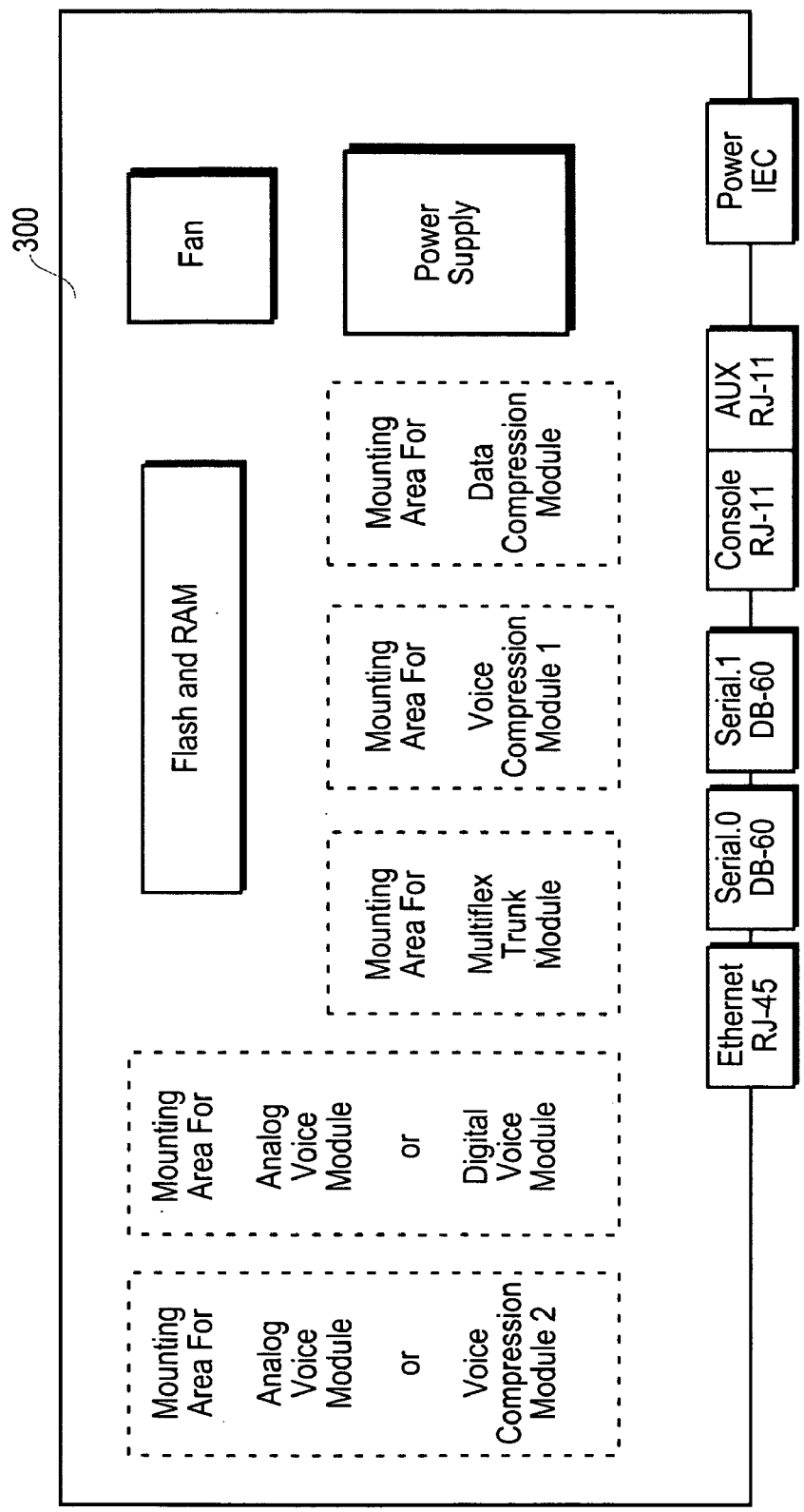
FIG. 3 is a block diagram of a basic configuration of a MAC of an embodiment of the present invention.

FIG. 3 is a block diagram of a basic configuration of a MAC 300 of an embodiment of the present invention. As previously discussed, a number of plug-in modules (PIMs) are supported by the MAC. The PIMs comprise a multiflex trunk module, a digital voice module, an analog voice module, three analog personality modules, a data compression module, and a voice compression module, but the embodiment is not so limited.

The Multiflex Trunk Module (MTM) of an embodiment provides the user with a multiservice T1/E1 trunk with built-in, long-haul CSU/short-haul DSU. The MTM is software configurable to support ANSI T1.403 (T1) or ITU G.703 (E1), but the embodiment is not so limited. Furthermore, the MTM supports connectivity to Frame Relay, ATM, and leased-line carrier services, but the embodiment is not so limited. The MTM derives network timing (clock) and distributes it to the UIOs and DVM. The MTM works in addition to the serial ports and does not preclude the use of either serial port or the Ethernet port.

The MAC of an embodiment supports multiple services of a single T1/E1 interface using a flexible time slot mapping scheme, but the embodiment is not so limited. The trunk may be divided by DS0 groups in a manner that best suits a particular user application. The MAC of one embodiment supports two trunk options, the channelized trunk option and the ATM trunk option, but the embodiment is not so limited.

Figure 4:
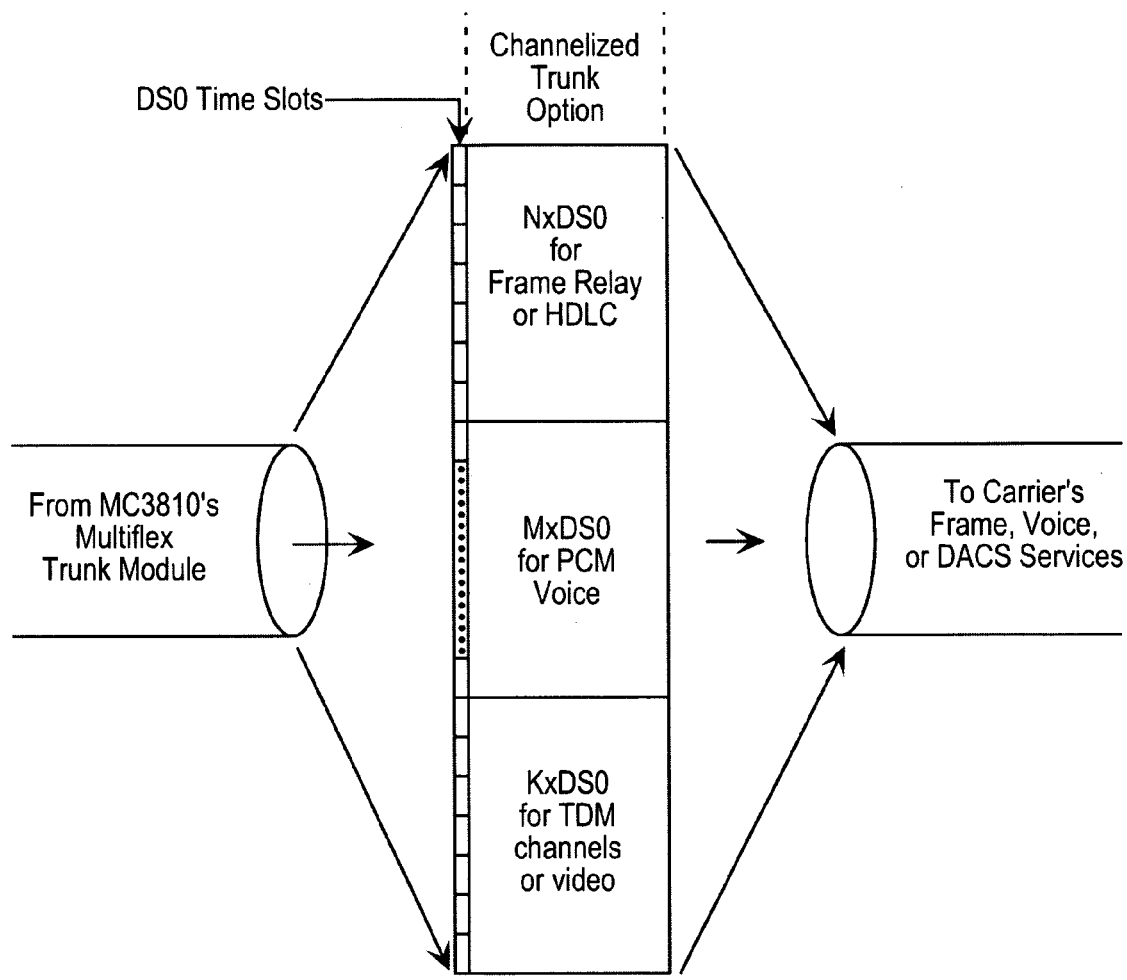
FIG. 4 shows a channelized trunk option of an embodiment of the present invention.

FIG. 4 shows a channelized trunk option of an embodiment of the present invention. The channelized trunk option utilizes the multiservice features of the MTM. The first N time slots are reserved for Frame Relay or HDLC trunk services, but the embodiment is not so limited. Packetized, compressed voice and data is carried within this band of N time slots. The next M time slots may be reserved for PCM voice, but the embodiment is not so limited. The carrier network routes PCM encoded voice on these time slots to their standard PSTN voice network. Lastly, K time slots are reserved for data and/or video transport through a carrier Digital Access and Cross-connect System (DACS) network, but the embodiment is not so limited.

Figure 5:
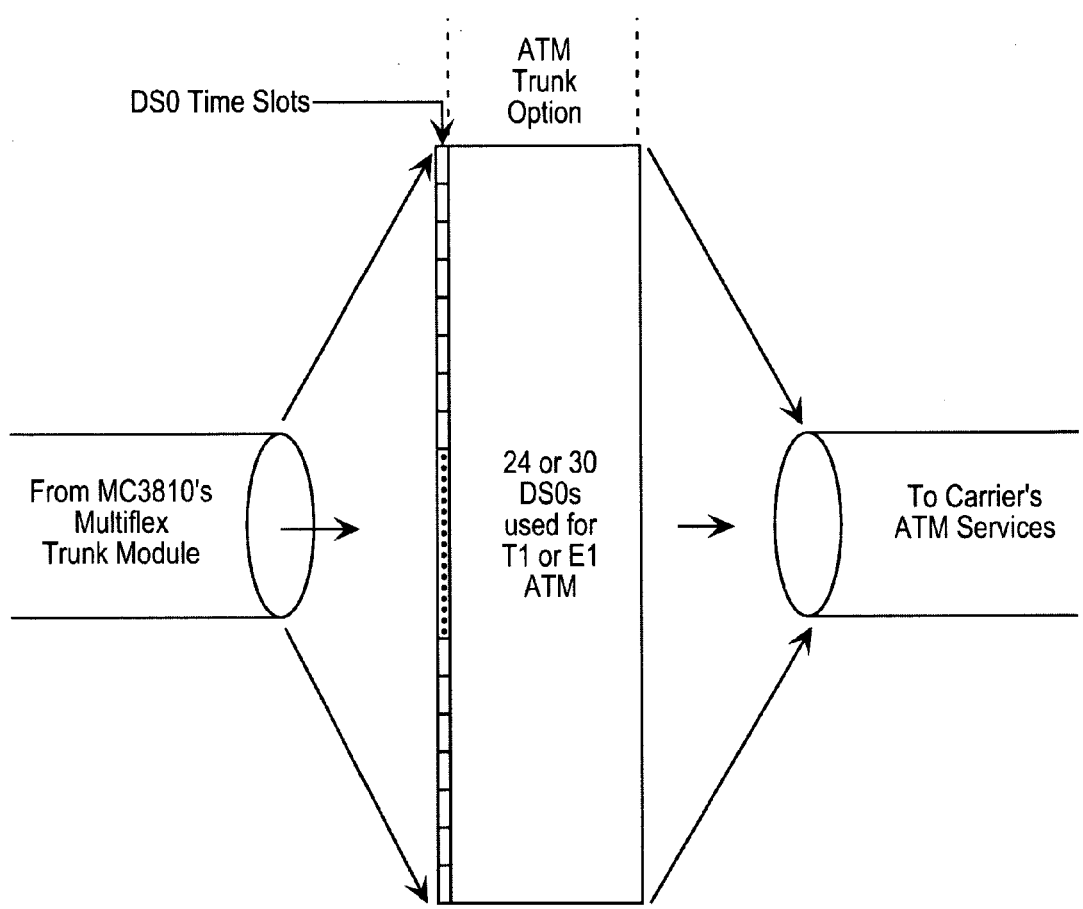
FIG. 5 shows an ATM trunk option of an embodiment of the present invention.

FIG. 5 shows an ATM trunk option of an embodiment of the present invention. The ATM trunk option utilizes the ATM functions of the MAC of one embodiment. In this mode the full T1/E1 is devoted to ATM. Voice connections are made via compressed voice using variable bit rate services. As with the channelized trunk option, multiple services, including LAN and video, may be passed over the ATM trunk.

The DVM of an embodiment provides connectivity to a digital private branch exchange or channel bank. The DVM is functionally equivalent to the MTM, but the embodiment is not so limited. Furthermore, the DVM provides a digital cross-connect function, allowing ingress time slots to be mapped directly to time slots on the out-bound MTM, but the embodiment is not so limited.

Figure 6:
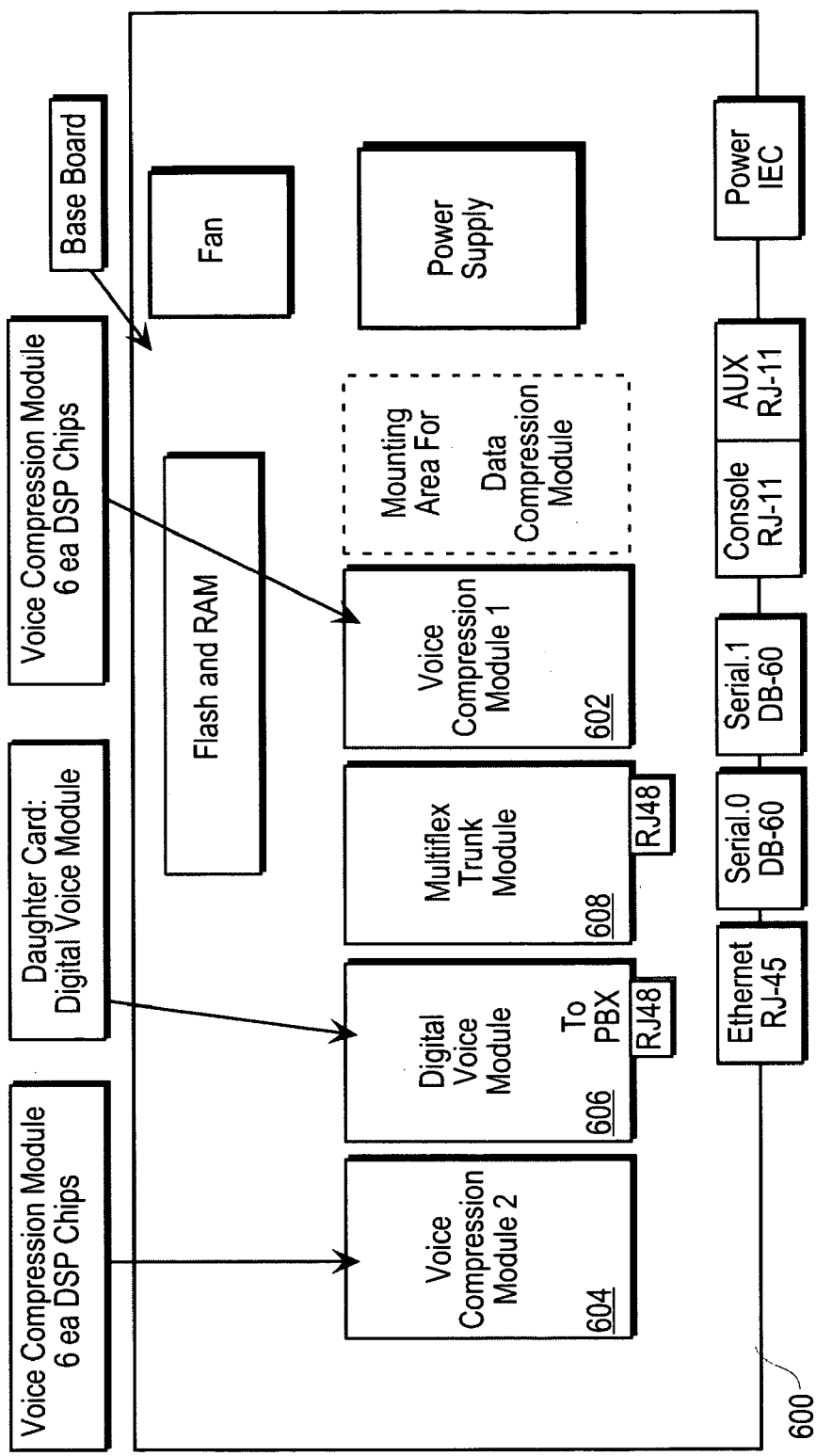
FIG. 6 is a block diagram of a MAC configuration of an embodiment of the present invention comprising digital voice and T1/E1 trunk capabilities.

FIG. 6 is a block diagram of a MAC configuration 600 of an embodiment of the present invention comprising digital voice and T1/E1 trunk capabilities. The MAC digital voice configuration comprises VCM 1 602, VCM 2 604, a DVM 606, and a MTM 608, but the embodiment is not so limited. Each of VCM 1 602 and VCM 2 604 comprises six digital signal processing (DSP) chips, but the embodiment is not so limited. The full digital voice configuration provides 24 compressed voice channels, but the embodiment is not so limited. In one embodiment, a private branch exchange is connected to the DVM 606, wherein voice channels are either mapped into voice compression channels, or mapped directly to PCM time slots allocated on the MTM 608. By using an external channelized device, such as a multiplexer, channel bank, or video codec, data can be mapped into the DVM 606 from outside sources and then directly to the MTM 608. North American Channel Associate Signaling (CAS) and Mercury CAS for the United Kingdom are supported; furthermore, Common Channel Signaling (CCS) is supported, but the embodiment is not so limited.

Figure 7:
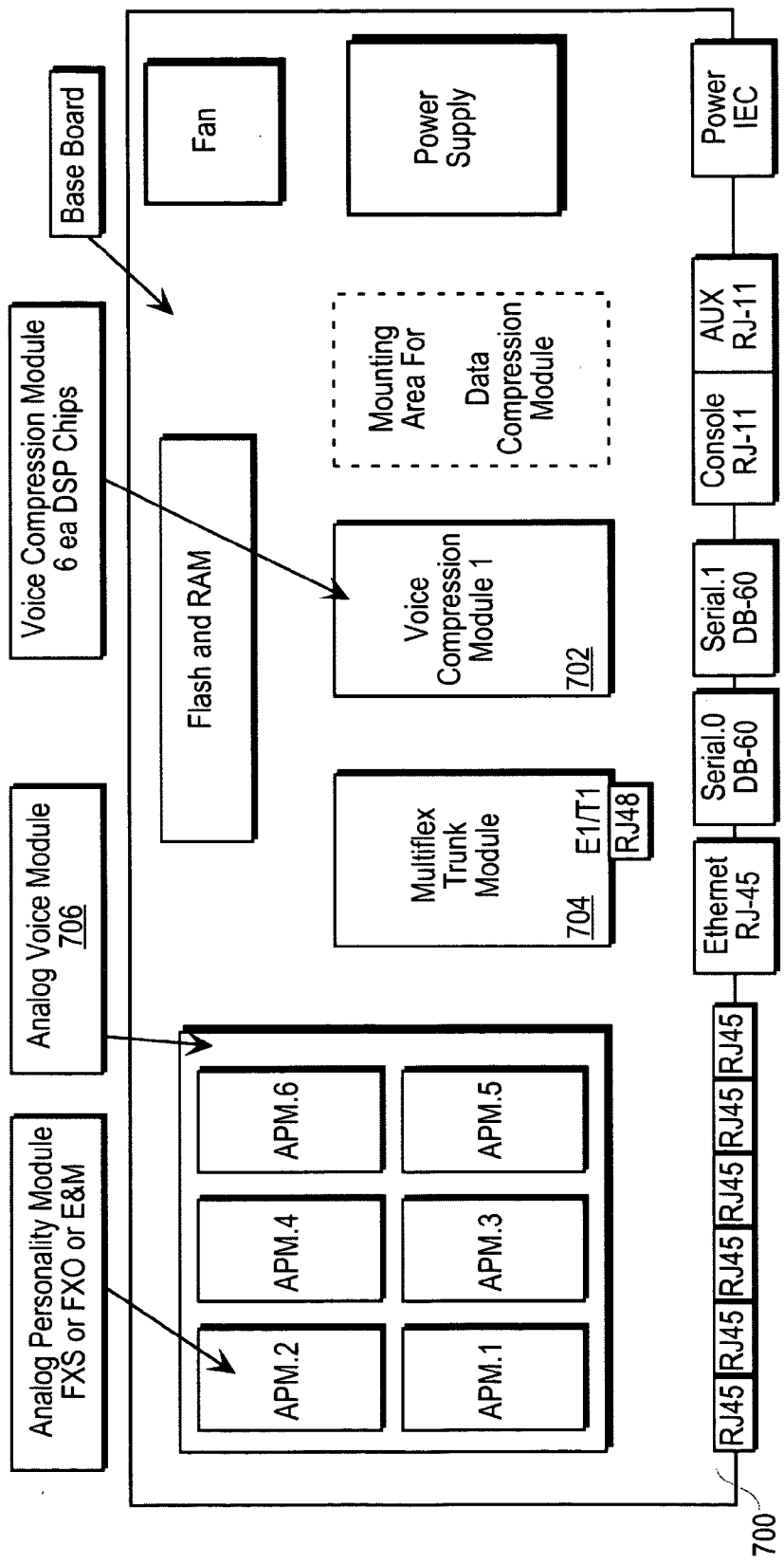
FIG. 7 is a block diagram of a MAC configuration of an embodiment of the present invention comprising analog voice and T1/E1 trunk capabilities.

The AVM of an embodiment provides six analog voice interfaces, but the embodiment is not so limited. The interfaces may be used with analog telephones, key systems, and private branch exchanges. FIG. 7 is a block diagram of a MAC configuration 700 of an embodiment of the present invention comprising analog voice and T1/E1 trunk capabilities. The MAC analog voice configuration comprises VCM 1 702, a MTM 704, and an AVM 706, but the embodiment is not so limited. The AVM 706 provides headers for mounting up to six Analog Personality Modules (APMs), but the embodiment is not so limited. An interface is activated when the user installs the desired style of APM on the AVM 706, wherein the desired style comprises FXS, FXO, and E&M, but the embodiment is not so limited. The AVM/APM combination provides, but is not limited to, the following features: six ports of FXS, FXO or E&M, in any combination; integrated talk battery and ring generator; adjustable transmit and receive levels; 2-wire FXS/FXO voice interface; 2 and 4 wire E&M interface; Wink Start, Immediate Start, & Delayed Start; software configurable ground start, loop start, or battery reversing signaling; software configurable a-law or mu-law PCM encoding; and, software configurable impedance. The VCM 1 702 comprises six DSP chips, but the embodiment is not so limited.

The APMs comprise FXO, FXS, and E&M signaling modules that are mounted on the AVM 706. The APMs comprise the codec that digitizes the voice into PCM samples, wherein the PCM samples are passed to the voice compression services. Furthermore, in one embodiment, FXS ports supply battery and connect to a telephone, FXO ports receive battery and connect to a central office trunk, and E&M ports connect to analog line cards on private branch exchanges, but the embodiment is not so limited.

In supporting voice channels, one embodiment of the MAC connects to the following types of telephone systems, but the embodiment is not so limited: analog telephone set via 2 wire connections; analog private branch exchange via 2 or 4 wire interface; key system via 2 or 4 wire connection; digital private branch exchange via T1/E1. Furthermore, signaling translation among FXS, FXO, and E&M types is supported on both the analog and digital interfaces.

The MAC of an embodiment uses several techniques to ensure near toll-quality voice when using public Frame Relay networks. These techniques comprise, but are not limited to, CS-ACELP voice compression, priority queuing, packet segmentation, and dynamic jitter control. Many of these techniques are inherent in ATM in some form. Therefore, when using an ATM trunk, the ATM Quality of Service (QOS) parameters, traffic shaping, and guaranteed cell size provide service guarantees.

The voice capabilities of an embodiment of the MAC are closely tied to the trunk options, but the embodiment is not so limited. The MAC of an embodiment supports a serial trunk option, a multiflex trunk option, and an ATM trunk option, but the embodiment is not so limited.

Figure 8:
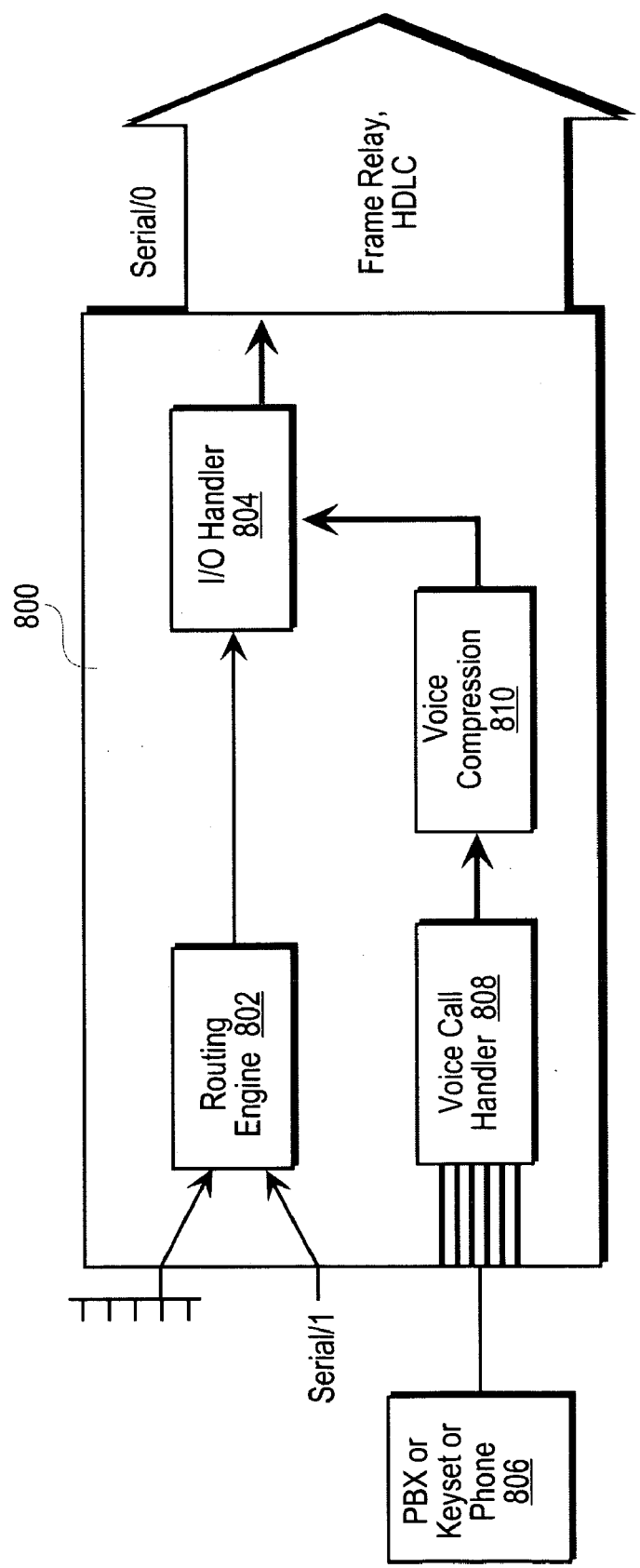
FIG. 8 shows the data and voice flows when using a serial port as a network interface in an embodiment of the MAC of the present invention.

FIG. 8 shows the data and voice flows when using a serial port as a network interface in an embodiment of the MAC 800 of the present invention. Data is received into a routing engine 802 and passed to an I/O handler 804. Voice channels are received from a private branch exchange, keyset, or telephone 806. The received voice channels are routed to a voice call handler 808, a voice compression engine 810, and to an I/O handler 804. The I/O handler 804 couples the data and voice to serial port 0 as the network interface.

Figure 9:
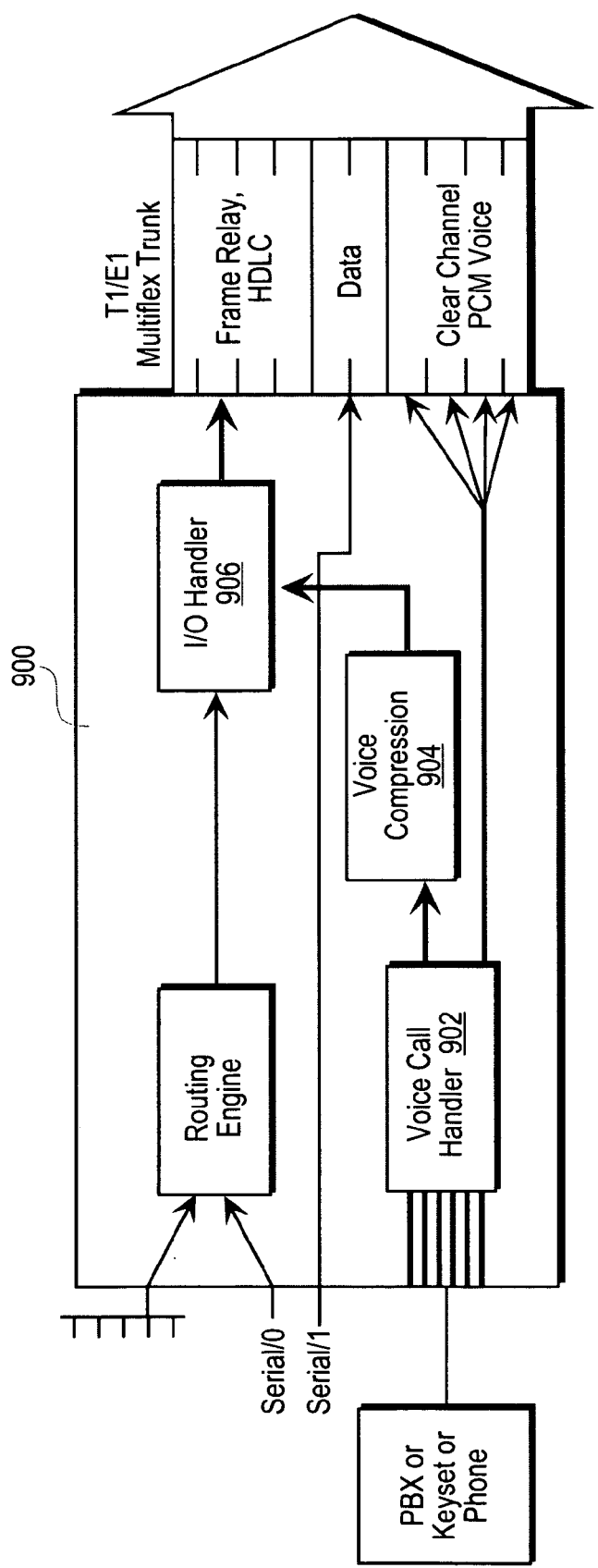
FIG. 9 shows the voice handling capability when using the multiflex trunk in an embodiment of the MAC of the present invention.
Figure 10:
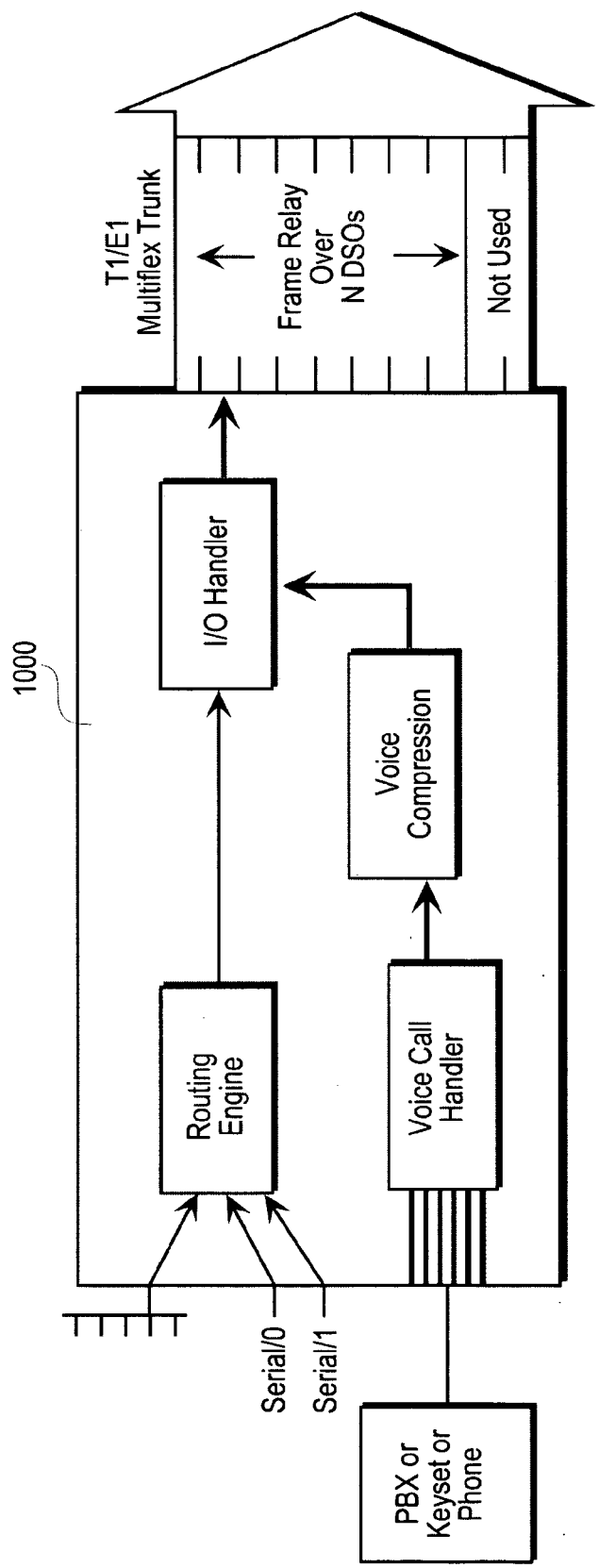
FIG. 10 shows the voice handling capability when using the T1/E1 multiflex trunk partially or entirely for Frame Relay in an embodiment of the MAC of the present invention.

FIG. 9 shows the voice handling capability when using the multiflex trunk in an embodiment of the MAC 900 of the present invention. Using this configuration, voice calls are routed through the voice call handler 902. When the channel is configured for TDM cross connect, the call is routed directly to the T1/E1 trunk, bypassing the voice compression engine 904. The carrier can then, within its DACS network, peel off the PCM channels and route them to the PSTN. The TDM cross connect function is available when the DVM is used for access to a private branch exchange, but the embodiment is not so limited. When the voice calls are configured to be compressed, the bit stream is passed to the voice compression engine, or sub-system, and then to the I/O handler 906. The I/O handler 906 encapsulates the voice in Frame Relay or HDLC and then passes the encapsulated voice to the trunk, but the embodiment is not so limited. FIG. 10 shows the voice handling capability when using the T1/E1 multiflex trunk partially or entirely for Frame Relay in an embodiment of the MAC 1000 of the present invention.

Figure 11:
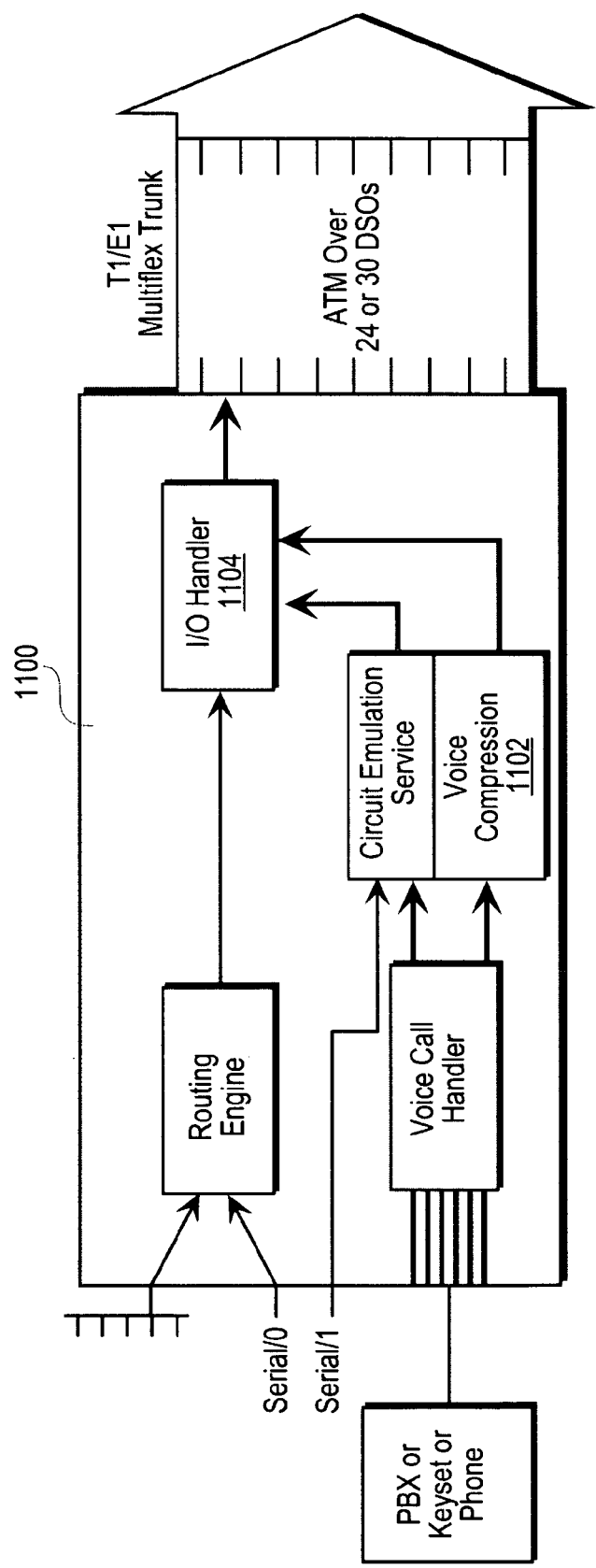
FIG. 11 shows the voice handling capability when using the ATM trunk in an embodiment of the MAC of the present invention.

FIG. 11 shows the voice handling capability when using the ATM trunk in an embodiment of the MAC 1100 of the present invention. Using this configuration, voice calls first go through the voice compression engine 1102 and are subsequently passed to the I/O handler 1104. The cells are then placed in a variable bit rate stream, but the embodiment is not so limited. A VCM performs voice compression, echo cancellation, silence suppression, and DTMF detection. The DTMF tones are passed through and are not locally emulated across a network connection, but the embodiment is not so limited.

In providing packetized voice, the MAC of an embodiment provides for the transport of compressed voice using data link formats comprising Frame Relay, ATM, and HDLC. The multiplexing of different types of traffic comprising voice, data, and facsimile, is provided over a single Frame Relay permanent virtual circuit (PVC). This feature reduces the cost of the Frame Relay network by reducing the number of PVCs required over each link. If desired, users may configure voice and data on different PVCs.

The MAC of an embodiment transports compressed voice over ATM trunks in an ATM Adaptation Layer 5 (AAL5) format, but the embodiment is not so limited. The AAL5 format is used because of a more streamlined encapsulation, and because it can be used to support silence suppression, producing a variable bit rate stream, but the embodiment is not so limited. The MAC of an embodiment uses HDLC encapsulation to combine voice and data over private, leased line networks, but the embodiment is not so limited.

The MAC of an embodiment supports pass-through voice, wherein channels from the DVM are mapped directly to time slots on the T1/E1 trunk. This TDM capability can significantly reduce access charges by permitting users to combine voice and data traffic onto a single T1 or E1 trunk. This capability provides excellent flexibility to provision voice channels directly to a PSTN.

The MAC of an embodiment supports call types comprising, but not limited to, local connection, on-net connection, on-net failed switching to off-net connection, auto-dial connection, private branch exchange tie-line connection, off-net connection, and auto-connection. The MAC, in providing voice services, supports a wide range of call management configurations comprising configurations for dialing on-net extensions, off-net numbers, and local calls, but the embodiment is not so limited. The MAC supports call set-up options comprising, but not limited to: on-net dialing; auto-dial, or private line automatic ringdown (PLAR); off-net dialing; and, tandem switching.

The MAC of an embodiment supports on-net dialing when a call originator dials an extension by entering a phone number; the call is connected within the wide area network. For on-net calls, a flexible call numbering plan allows dialing to any port on any system in the network by dialing a unique prefix that identifies the port or group of ports on the destination system, wherein the destination system ports are called a trunk-group. When the remote port is connected to a private branch exchange, either analog or digital, that port may be configured to request extra digits from the originator. The extra digits are passed on to the private branch exchange which will use them to connect the call to the correct extension. Call routing is supported via a static mapping table in each MAC, but the embodiment is not so limited.

The MAC of an embodiment supports PLAR, but the embodiment is not so limited. The PLAR is supported with a MAC configured so that an off-hook condition at one extension causes the associated MAC to automatically dial another extension elsewhere in the network.

The MAC of an embodiment supports off-net dialing, wherein when a caller dials "9", or another pre-programmed digit/digits, the MAC automatically connects the caller extension to a channel connected directly to a PSTN. In one embodiment, off-net calls are made by dialing a trunk group identifier that tells the MAC of one embodiment to select a specific trunk-side port or group of ports that are configured as pass-through connections to the PSTN, but the embodiment is not so limited. Furthermore, the placement of calls from one channel to another on the same MAC is supported. This feature provides private branch exchange functionality at non-private branch exchange sites. Moreover, incoming calls on pass-through channels are configured to connect to specific voice ports on the MAC of one embodiment. This functionality provides a way for a facsimile machine connected to an analog port to be used for both on-net and off-net calls.

The MAC of an embodiment supports tandem switching in order to control network line costs, but the embodiment is not so limited. Tandem switching allows a call to transit through one MAC without requiring the call to be decompressed and routed through the private branch exchange. This maintains voice quality and reduces the number of PVCs needed to mesh a network. Tandem switch routes are stored in a static table and are defined by the user; however, the tandem switch table supports the use of wild card entries to facilitate building large, structured dial plans.

Management and configuration of the MAC of one embodiment is designed to be compatible with existing network router management systems. As such, three types of configuration interfaces are provided, wherein the configuration interfaces comprise a command line interface, a Hypertext Transfer Protocol (HTTP)-based configuration server, and a Simple Network Management Protocol (SNMP)-based Management Information Base (MIB), but the embodiment is not so limited.

In the operation of routing integrated traffic comprising data, voice, and video traffic, at least one data stream, at least one voice channel, and at least one video stream are received. Furthermore, the received information comprises Local Area Network (LAN)-based traffic and facsimile traffic. The received data stream is packetized. Software-based and hardware-based compression and encryption of the data stream are provided, but the embodiment is not so limited. Compression and decompression of the voice channel are provided, as well as echo cancellation, but the embodiment is not so limited. The video stream comprises circuit and packet mode video, wherein the circuit mode video is transported bit-by-bit through circuit emulation using a constant bit rate ATM connection, wherein the packet mode video is transported using a variable bit rate ATM connection, but the embodiment is not so limited.

The packetized data stream is multiplexed with the voice channel and the video stream to form an integrated transport stream. The integrated transport stream is provided to at least one multi-service network using a configurable trunk. The multi-service network includes cell-based and packet-based networks comprising Asynchronous Transfer Mode (ATM), Frame Relay, High-level Data Link Control (HDLC), Internet Protocol (IP), and Time Division Multiplex (TDM) networks, as well as leased-line carrier services. The trunk is configured at a physical level and a protocol level using at least one trunk option, wherein configuring comprises using software to configure the trunk among a number of service connections and allocate a plurality of trunk channels and time slots among at least one multi-service network connection. A first trunk option comprises a structured or channelized trunk option comprising time slot mapping, and a second trunk option comprises an ATM trunk option, but the embodiment is not so limited. In one embodiment a real time service class and a non-real time service class are provided, but the embodiment is not so limited. The real time service class is used for the voice channel and the video stream, wherein the non-real time service class is used for the data stream.

Figure 12:
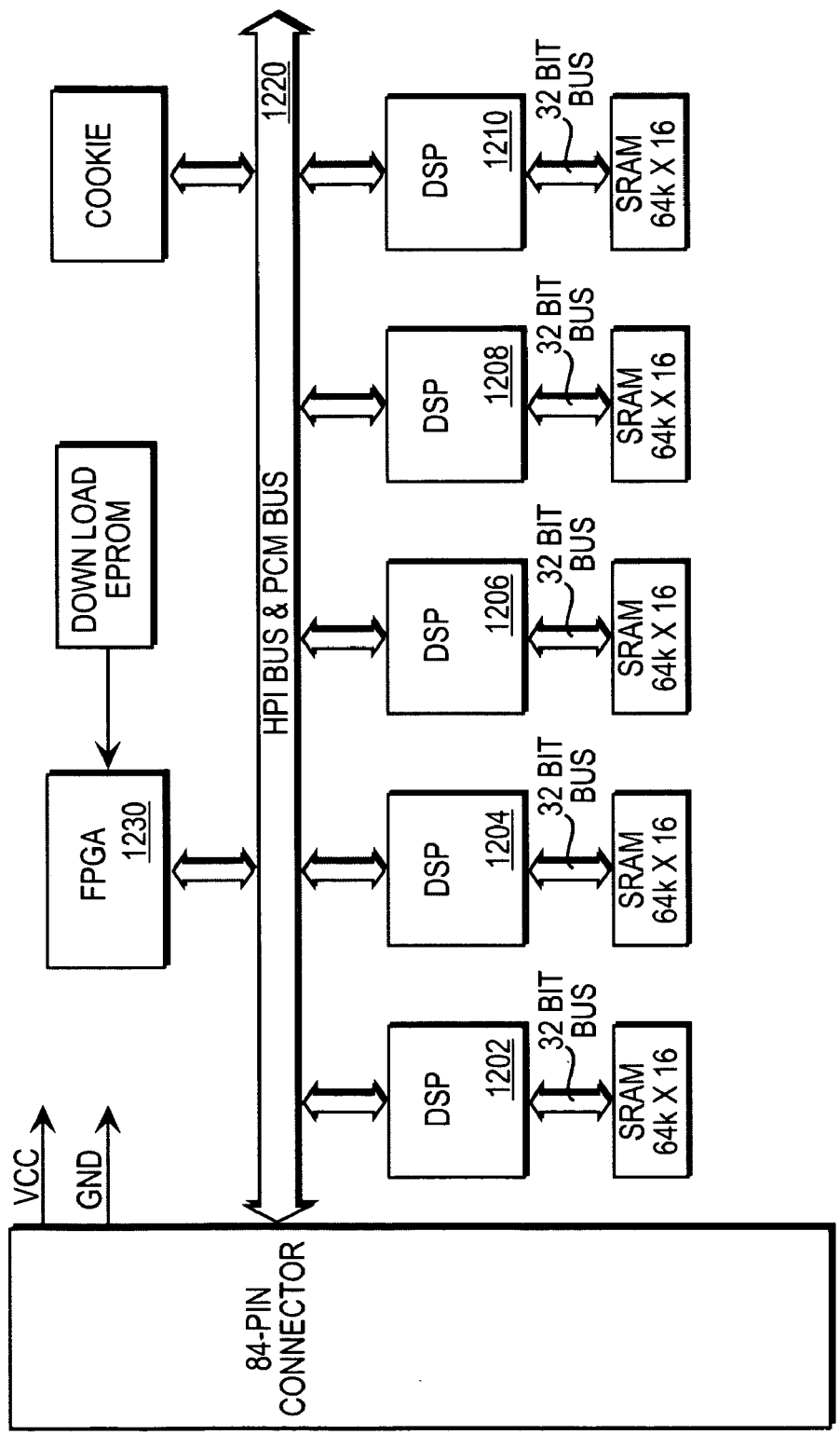
FIG. 12 is a Voice Compression Module of a MAC of an embodiment of the present invention.

FIG. 12 is a Voice Compression Module of a MAC of an embodiment of the present invention. The VCM comprises a circuit card containing multiple DSPs 1202–1210 coupled to a PCM bus 1220, but the embodiment is not so limited. Each DSP can run either two channels of G.729a ACELP, or one channel of G.729 ACELP, but the embodiment is not so limited. Each DSP is programmed to take two time-slots from the voice PCM bus 1220 by programming a connection bit map device. The connection bit map device of one embodiment is provided by a field programmable gate array (FPGA) circuit 1230, but the embodiment is not so limited.

Figure 13:
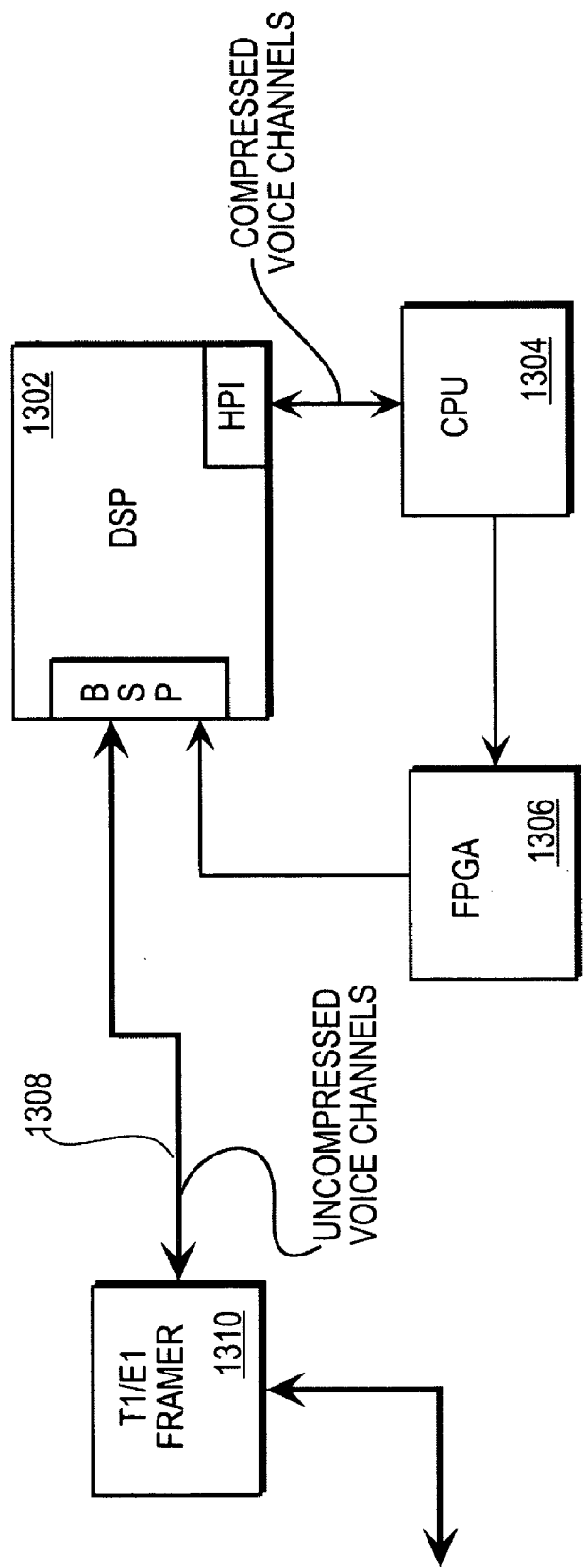
FIG. 13 is a TDM interface of an embodiment of the present invention.
Figure 14:
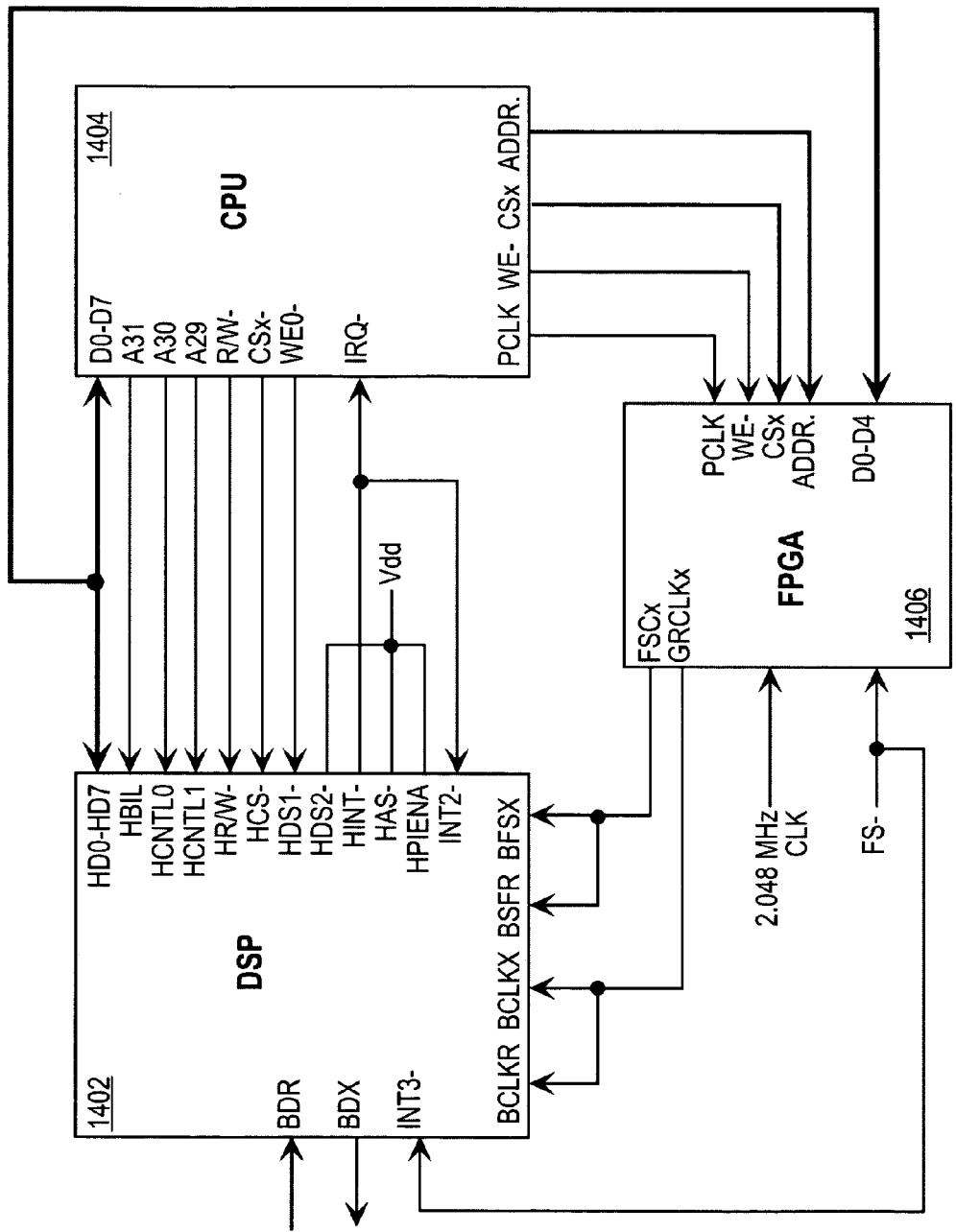
FIG. 14 shows the hardware interconnection of a TDM interface of an embodiment of the present invention.

The MAC of an embodiment comprises a TDM interface designed for an environment comprising multiple DSPs. FIG. 13 is a TDM interface of an embodiment of the present invention. The interface, used in a voice over Frame Relay application, allows for communication among multiple DSPs 1302 coupled among a CPU 1304, an FPGA 1306, a PCM bus 1308 and a T1/E1 framer 1310, but the embodiment is not so limited. The CPU 1304 determines the voice channel that will be compressed/decompressed by a DSP 1302, using a pre-determined voice coding scheme. FIG. 14 shows the hardware interconnection of a TDM interface of an embodiment of the present invention. In an embodiment, the interface comprises at least one DSP 1402 coupled to a CPU 1404 and an FPGA 1406, but the embodiment is not so limited. In providing a TDM interface among a high-speed data stream and multiple processors of an embodiment of the present invention, a dynamic association is established and maintained among a number of processors and a number of voice channels of a data stream.

Figure 15:
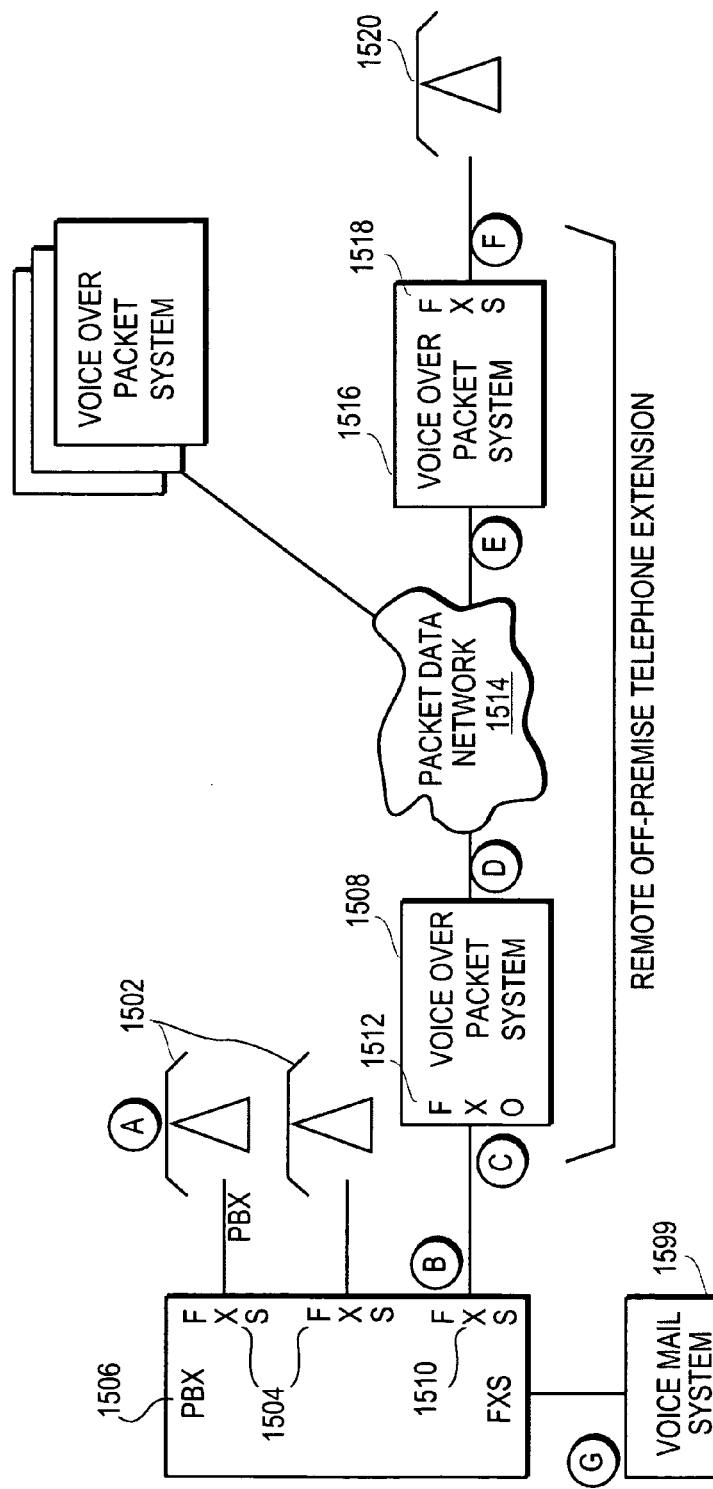
FIG. 15 is a diagram of MACs of an embodiment of the present invention providing remote off-premise extensions via a wide area packet data network.

FIG. 15 is a diagram of MACs of an embodiment of the present invention providing remote off-premise extensions via a wide area packet data network. A number of telephones 1502 are connected directly to FXS interface ports 1504 of a private branch exchange (PBX) 1506. In providing remote off-premise extensions, a telephone connected to the PBX 1506 is replaced by a voice-over packet-data-network system (VOPS) device 1508, wherein the MAC of an embodiment operates as the VOPS device 1508, but the embodiment is not so limited. The VOPS device 1508 couples to the FXS interface 1510 of the PBX 1506 by providing an FXO interface port 1512. The FXO interface port 1512 provides an electrical interface that is equivalent to that of a standard telephone, but the embodiment is not so limited.

The first MAC 1508 is coupled via a wide area packet data network (WAN) 1514 to a second VOPS device 1516 located at at least one remote location, wherein a second MAC of an embodiment operates as the second VOPS device 1516. The second MAC 1516 provides a FXS interface port 1518 that is coupled to a telephone 1520. The VOPS devices 1508 and 1516 may be part of a larger system of voice over packet-data-network systems devices coupled together by the WAN 1514. This system is intended to provide switched and permanent voice calls between telephones 1502 and 1520 connected to at least one VOPS at various locations with the voice calls being carried over the wide area packet data network 1514.

As a special case of the MAC operation, the MAC interface is configured to provide Private Line Automatic Ringdown (PLAR). Using PLAR, the destination telephone number for a call is pre-configured, wherein upon removal of the local telephone handset from the cradle, a call to a specified remote telephone is setup without requiring the caller to enter a telephone number.

Furthermore, another special case is supported by the MAC, wherein a pair of telephone interfaces are configured using PLAR such that when either telephone is picked up, the other telephone in the pair is called. This configuration creates a one-to-one linkage between the two telephones or telephone interfaces similar to a tie-line. This special configuration of the MAC is considered to provide tie-line emulation, but the embodiment is not so limited. This tie-line emulation configuration can be used where one MAC provides a FXS interface and another MAC provides a FXO interface. In this case, the VOPS designed to provide switched voice calls can be used to provide remote off-premise extensions using tie-line emulation. The tie-line emulation supported by the MAC of an embodiment is favorably different, however, from a true tie-line because, in the case of tie-line emulation, no network resources are required or consumed when there is no call in progress. While a true tie-line system provides a permanent connection between two telephone interfaces, it has the disadvantage of consuming system resources even when there is no call in progress.

The MAC of an embodiment improves the functionality of the emulation of tie-line functionality by a switched call system, wherein the ringing state of the FXO interface is effectively passed through the FXS port without requiring a permanent connection between the FXO and FXS interfaces. The MAC is able to do this without causing an off-hook condition on the FXO interface. This allows the PBX forward on ring-no-answer feature to operate in conjunction with the remote off-premise extension via switched call tie-line emulation.

With reference to FIG. 15, an example of a call that uses the MAC tie-line emulation of an embodiment to provide remote off-premise extension is described. In operation, a caller uses telephone 1502 to dial an extension number for a remote telephone 1520. The PBX 1506 generates a ringing voltage signal (for a loop start interface) onto the FXS interface 1510 for the remote telephone extension 1520. The FXO interface port 1512 on the first MAC 1508 detects the ringing signal and answers the call by going off-hook. The first MAC 1508 places a PLAR call to the second MAC 1516 via the WAN 1514. The second MAC 1516 receives the call over the WAN 1514 and proceeds to generate ringing voltage to the FXS interface 1518 which rings the remote telephone 1520. During the period that the remote telephone 1520 is ringing, the second MAC 1516 provides an audible ringing tone, via the WAN connection 1514, which is heard by the caller. If available, a user answers the remote telephone 1520, wherein a voice connection is established between the caller and the remote telephone user.

Figure 16:
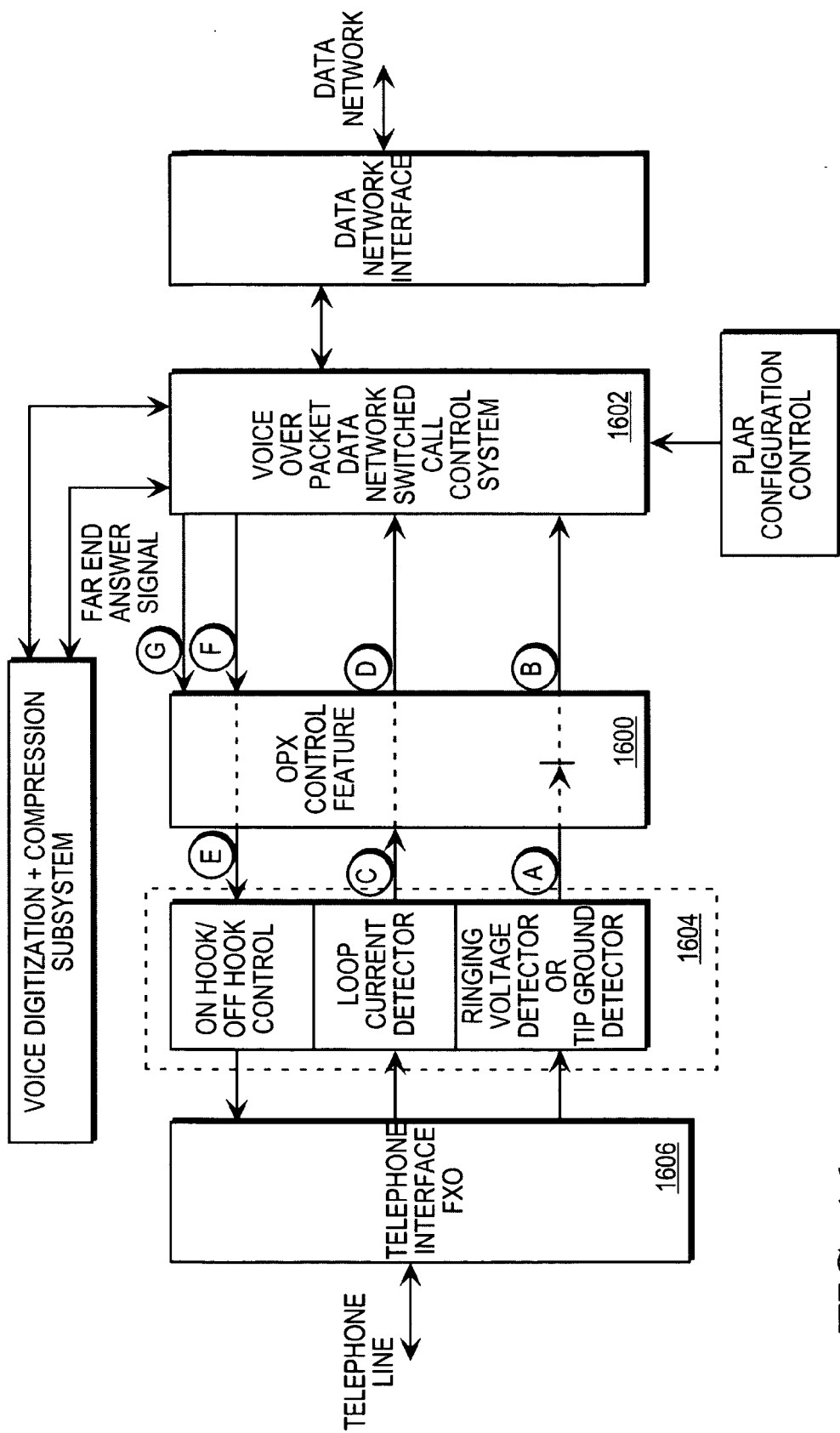
FIG. 16 is a block diagram of a telephone interface control system comprising an OPX Control Feature of an embodiment of the present invention.

In the event that the remote telephone 1520 is not answered, the system behavior desired by the caller is that the PBX 1506 should forward the call to a voice-mail system 1599 or, alternatively, another telephone extension. The MAC of an embodiment provides this desired behavior using an OPX Control Feature (OPXCF) of the MAC system that controls the FXO telephone interface. FIG. 16 is a block diagram of a telephone interface control system comprising an OPX Control Feature 1600 of an embodiment of the present invention. The OPXCF 1600 is used between a VOPS switched call control system (SCCS) 1602 and the telephone interface detectors and controls 1604, but the embodiment is not so limited.

The OPXCF 1600 of an embodiment handles an arriving call on the telephone interface 1606 by generating a ringing voltage detection signal, for loop start interfaces, or tip-ground signal, for ground start interfaces, at point A. The OPXCF 1600 passes this signal to point B. The SCCS 1602 responds to the ringing/tip-ground signal at B and asserts an offhook signal at point F. The SCCS 1602 establishes a PLAR call with the remote VOPS (not shown). The OPXCF 1600 blocks the offhook signal and does not pass it to point E, such that the FXO interface 1606 remains in the onhook state. Once the OPXCF 1600 receives the offhook signal at point F from the SCCS 1602, it blocks the ringing signal at B. The OPXCF 1600 then generates an artificial loop current signal at D to provide the appearance to the SCCS 1602 that the FXO interface 1606 is offhook, that ringing signal is not present, and that loop current is present.

The OPXCF 1600 maintains this state until one of two things happens: the ringing voltage signal or tip-ground signal is removed by the PBX as a result of forwarding on ring-no-answer or the caller aborting the call attempt; or, a signal is received at point G indicating that the remote FXS interface (not shown) has answered the call.

In the case where the ringing voltage or tip-ground signal is removed, the OPXCF 1600 removes the loop current detection signal at D. This indicates to the SCCS 1602 that a disconnect supervision signal has been received from the telephone interface. This signal will cause the SCCS 1602 to terminate the call attempt and return all system components to the idle/onhook state. The OPXCF 1600 is signaled that the SCCS 1602 has return to the idle state by the presence of an onhook signal at point F. Once returned to the idle state, the OPXCF 1600 will cease to block the onhook control signal E–F so that the SCCS 1602 may elect to place another or a next outgoing call on the telephone interface. Furthermore, the OPXCF 1600 ceases blocking of the ringing voltage/tip-ground signal in preparation for handling of the next call.

In the case where the remote extension answers the call, the OPXCF 1600 responds to the far-end answer indication at point G by allowing the offhook signal at point F to propagate to point E, wherein the telephone interface 1606 responds by entering the offhook state. In this condition, the OPXCF 1600 will stop generating a loop current signal at point D and pass the actual loop current indication signal from point C to point D. Furthermore, the OPXCF 1600 ceases blocking of the ringing signal between points A and B and passes the actual signal between points A and B; in the offhook state, the telephone interface 1606 will not indicate ringing. The OPXCF 1600 is now in a state where it is no longer modifying the control and detector signals, wherein normal call processing by the SCCS 1602 will be in force for the remainder of the call.

When implementing permanent voice calls for tie-line replacement and emulation of circuit switched connections between private branch exchanges (PBXs) using voice-over-packet via data permanent virtual circuits (PVCs), an embodiment of the present invention provides a degree of fault tolerance such that from the perspective of the PBXs, or similar telephony equipment, the permanent voice or tie line connections provided are really permanent and reliable. An embodiment of the present invention comprises a system for creating a fault tolerant permanent voice call using Frame Relay Forum FRF.11 Implementation Agreement protocol voice links, but the embodiment is not so limited. While an embodiment uses the FRF.11 protocol, the embodiment may be applicable to voice-over-packet protocols other than the FRF.11 protocol which do not comprise an end-to-end call setup and tear-down mechanism, but the embodiment is not so limited.

The FRF.11 protocol allows for creation of a connection by coupling a number of FRF.11 network links in a series. Furthermore, each node in the network link chain may detect the failure of the permanent voice connection and provide a mechanism for re-establishing the permanent connection using an alternate route or an alternate end-point, but the embodiment is not so limited. The network nodes may be end-point nodes, for example voice-ports, or mid-point nodes, for example forwarding nodes. The mechanisms used by an embodiment do not require any special modification of the FRF.11 format packets. Moreover, all nodes comprising the FRF.11 protocol network chain need not embody the present invention in order for some degree of fault tolerance to be provided.

Figure 17:
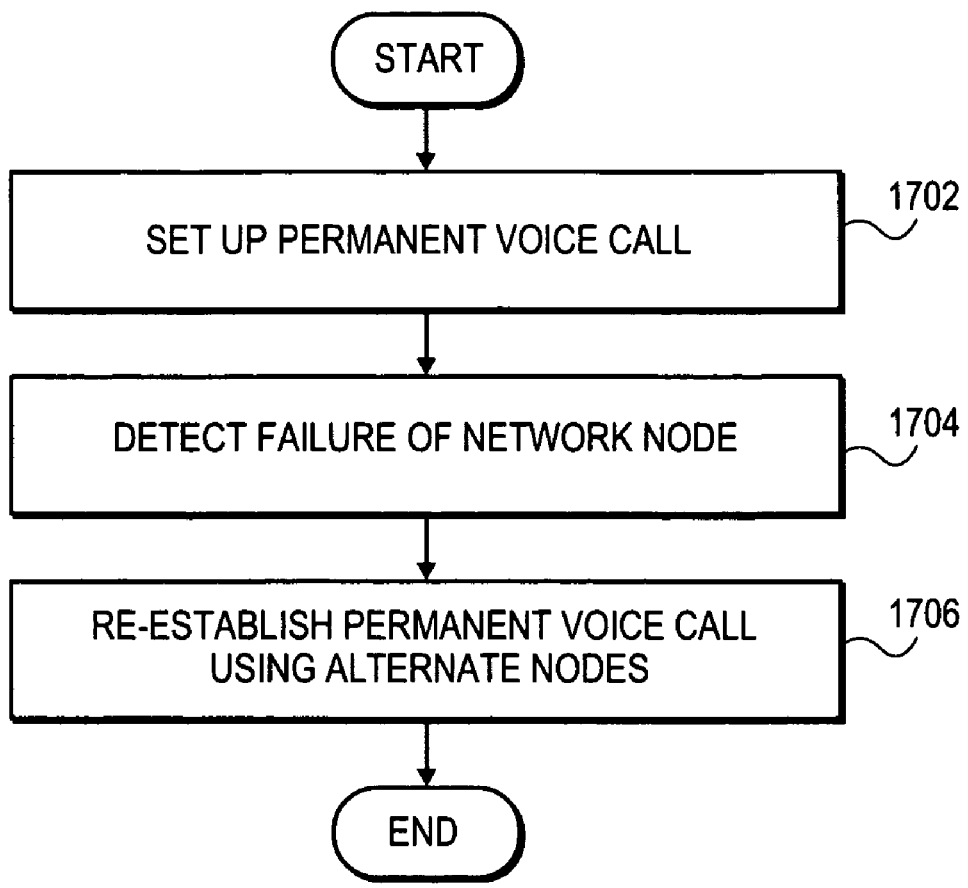
FIG. 17 is a flowchart of a method for providing fault tolerant permanent voice calls in a voice over packet-data-network system (VOPS).

FIG. 17 is a flowchart of a method for providing fault tolerant permanent voice calls in a voice over packet-data-network system (VOPS). Operation starts at step 1702, at which at least one permanent voice call is setup by coupling a number of nodes in series using a voice-over-packet protocol. The nodes comprise one end-point nodes and intermediate nodes, but the embodiment is not so limited. A failure of at least one of the series nodes is detected, at step 1704. The permanent voice call connection is automatically re-established using at least one alternate node, at step 1706, wherein the alternate node comprises at least one alternate intermediate node and at least one alternate end-point node. The permanent voice call of an embodiment is transmitted over a Frame Relay network in accordance with a standard comprising a Frame Relay Forum FRF.11 Implementation Agreement, but the embodiment is not so limited.

In providing fault tolerant permanent voice calls in a VOPS, at least one set of primary connection bindings are defined for a permanent voice call between a first and a second port. The first and second ports may be located on different private branch exchanges. Furthermore, at least one set of alternate connection bindings are defined for the permanent voice call. The elements of the set of primary connection bindings may overlap with elements of the set of alternate connection bindings, but the embodiment is not so limited. At least one preference-based list is generated comprising the at least one set of alternate connection bindings. Each node operating with the FRF.11 protocol is capable of determining at least one out-of-service state for the node. A reconnection relationship is established between nodes on either side of a node determined to be out-of-service, and the permanent voice call is reconnected using one of the set of alternate connection bindings.

Figure 18:
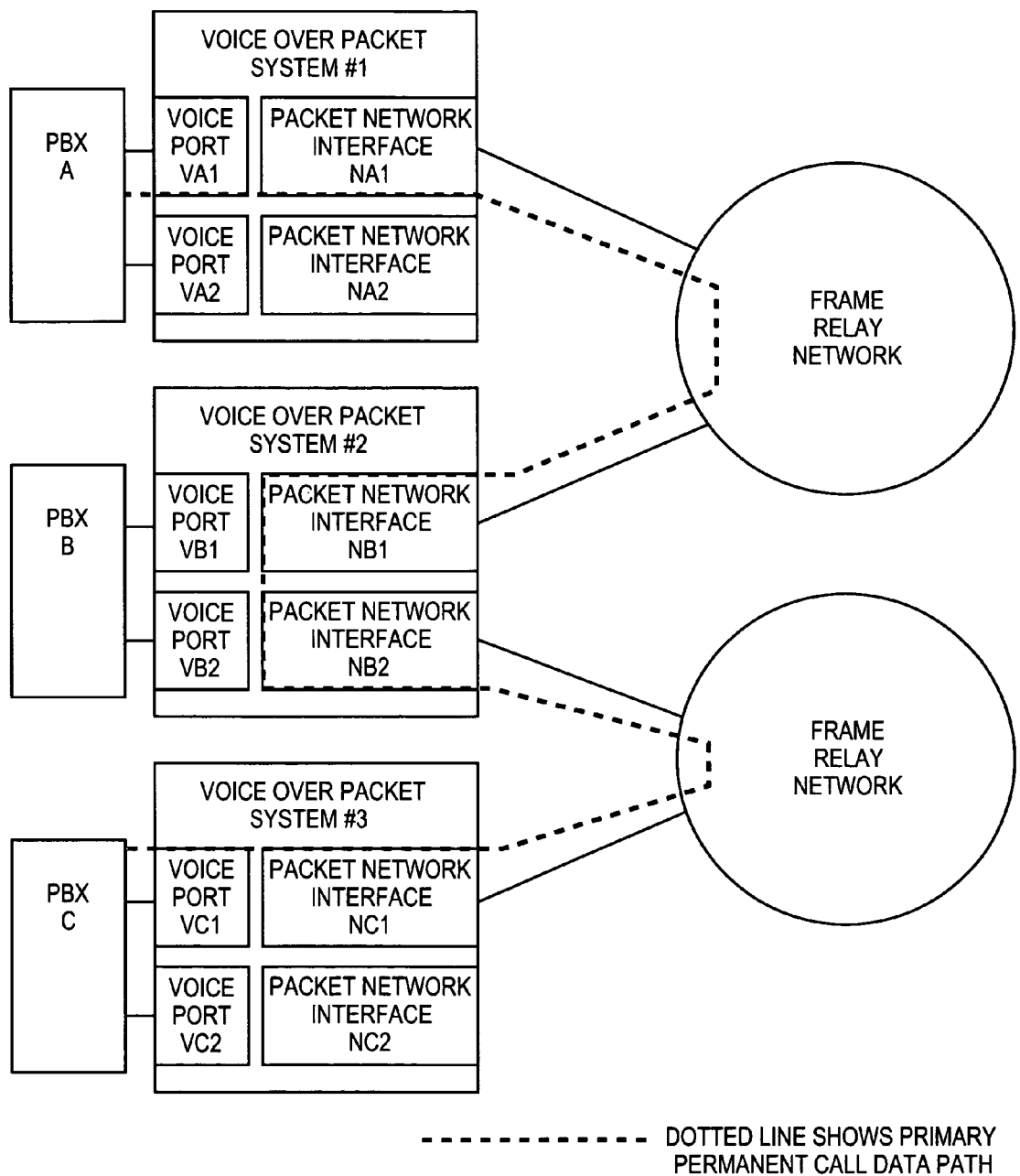
FIG. 18 is a diagram of a primary permanent voice call connection of an embodiment created via a voice-over-packet system used to link two PBXs A and C via an intermediary voice-over-packet system PBX B.
Figure 19:
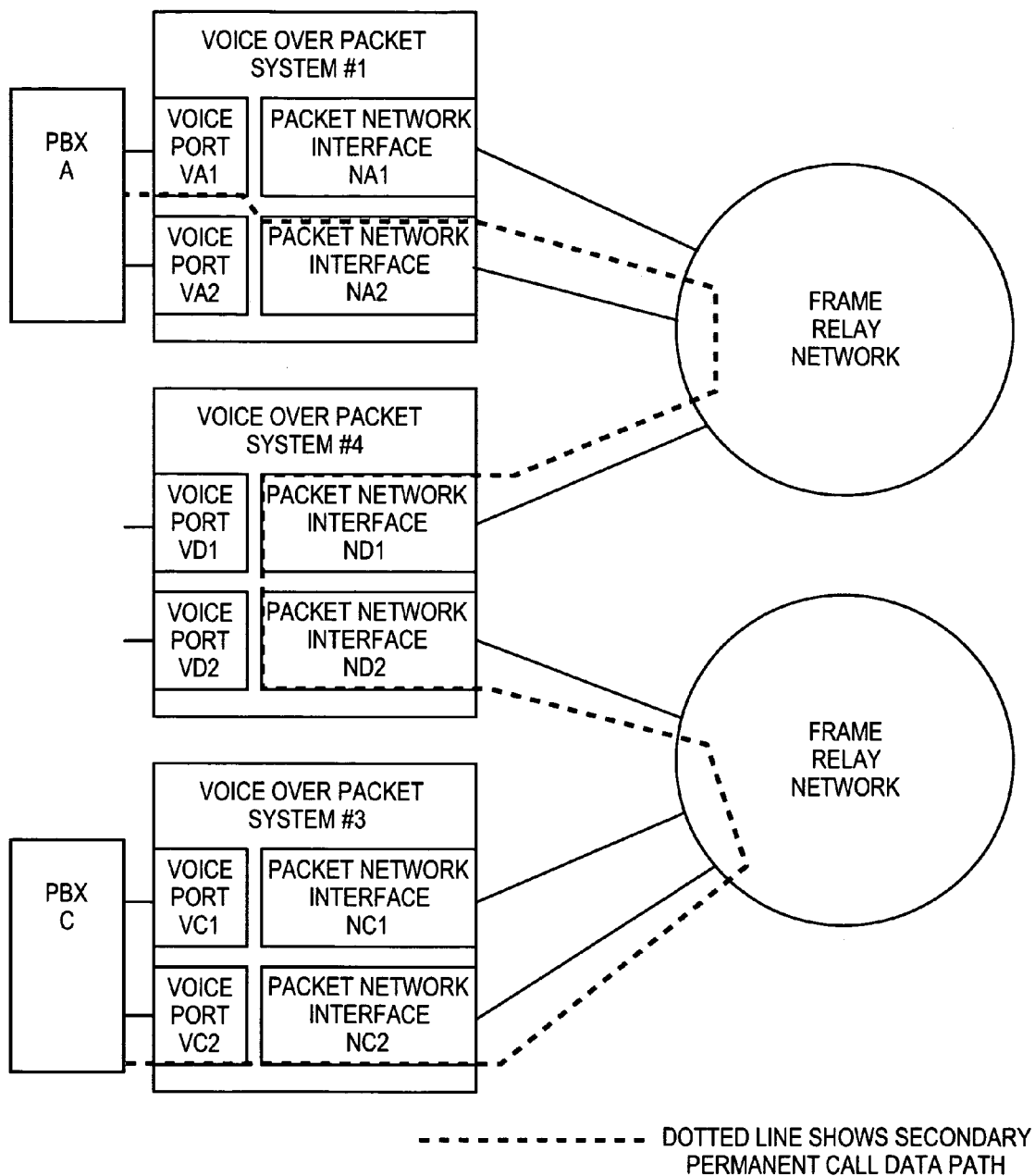
FIG. 19 is a diagram of an alternate permanent voice call connection of an embodiment created via a voice-over-packet system used to link two PBXs A and C via an intermediary VOPS #4.

FIG. 18 is a diagram of a primary permanent voice call connection of an embodiment created via a voice-over-packet system used to link two PBXs A and C via an intermediary voice-over-packet system PBX B. FIG. 19 is a diagram of an alternate permanent voice call connection of an embodiment created via a voice-over-packet system used to link two PBXs A and C via an intermediary VOPS 4. The permanent call connection via the VOPS system is intended to be transparent to the PBX systems such that the PBX systems appear to be directly connected, wherein PBX A appears to be directly connected to PBX B, PBX B appears to be directly connected to PBX C, and PBX A appears to be directly connected to PBX C. The VOPS permanent call connection A–C exists via the path VA1-NA1-NB1-NB2-NC1-VC1. The VOPS systems shown have two voice ports and two network interfaces, but the embodiment is not so limited.

This invention comprises a set of configuration information and associated behaviors for the VOPS systems that provide fault tolerant functionality for voice-over-packet permanent call connections, but the embodiment is not so limited. The application described herein refers to the Frame Relay Forum FRF.11 protocol and comprises behaviors that act as an extension to this protocol without requiring modification of the protocol. Furthermore, the present invention may be applied to other voice call protocols that have similar properties to the FRF.11 protocol, specifically protocols that lack an end-to-end call setup and teardown syntax.

The configuration of an embodiment of the present invention defines a set of primary connection bindings that create a primary path for the permanent voice-over-packet connection. Furthermore, one or more secondary connection bindings are defined that create one or more secondary paths for the permanent voice-over-packet connection. Elements of the primary and secondary connection paths may overlap. An embodiment of the present invention defines a set of criteria for detecting the loss of end-to-end connectivity and a process to follow in selecting a secondary connection path. Moreover, a temporary behavior is defined during the time required to re-establish connectivity via a secondary path, wherein the temporary behavior may become a sustained behavior in the event that it is not possible to re-establish connectivity. The invention supports optional full or partial redundancy of all elements of the VOPS permanent call connection path including the voice ports that terminate the VOPS portion of the connection path.

With reference to FIGS. 18 and 19, a description of an example configuration of an embodiment is provided, but the embodiment is not so limited as many other similar configurations are possible. A primary connection path configuration is established on VOPS #1 that binds voice port VA1 to network interface NA1 and selects a data permanent virtual circuit (PVC) and, if required, a sub-channel within the PVC. The PVC is created within the network interface NA1, and a permanent call connection protocol is selected. The permanent call connection protocol of an embodiment is FRF.11, but the embodiment is not so limited.

The designation of the connection as the primary connection may be based solely on the need to designate the default connection, but the embodiment is not so limited. Designation of the connection route as primary does not necessarily imply that the primary route is more advantageous than the secondary route or routes.

A primary connection configuration is established on VOPS #2 that selects a data PVC and, if required, a sub-channel within the PVC. The PVC is created within the network interface NB1. A data PVC and, if required, a sub-channel within the PVC are selected and created within the network interface NB2. The PVCs and the required subchannels are bound to form a bi-directional forwarding link such that packets that arrive at NB1 are forwarded to NB2, and vice-versa.

A primary connection configuration is established on VOPS #3 that binds voice-port VC1 to network-interface NC1 and selects a data PVC and, if required, a sub-channel within the PVC. The PVC is created within the network interface NC1, and a permanent call connection protocol is selected. It is noted that the coupling through VOPS #2 is optional in that it is possible to create a direct connection that links VOPS #1 to VOPS #3 without an intermediary forwarding connection. The number of forwarding connections may be greater than one, equal to one, or zero, but the embodiment is not so limited.

A secondary connection path configuration is established on VOPS #1 that binds voice port VA1 to network interface NA2 and selects a data PVC and, if required, a sub-channel within the PVC. The PVC is created within the network interface NA2, and a permanent call connection protocol is selected.

A secondary connection path configuration is established on VOPS #4 that selects a data PVC and, if required, a sub-channel within the PVC. The PVC is created within the network interface ND1. Furthermore, a data PVC and, if required, a sub-channel within the PVC are selected and created within the network interface ND2. The PVCs and the required subchannels are bound to form a bi-directional forwarding link such that packets that arrive at ND1 are forwarded to ND2, and vice-versa.

A secondary connection path configuration is established on VOPS #3 that binds voice port VC2 to network interface NC2 and selects a data PVC and, if required, a sub-channel within the PVC. The PVC is created within the network interface NC2, and a permanent call connection protocol is selected.

It is noted that in this example configuration, the first voice port VA1 is shared between the primary route and the secondary route. While it is not necessary for all links in the connection path to be unique, keeping all links unique will increase the degree of fault tolerance achieved in an embodiment.

At each node in the FRF.11 chain, the configurations that follow are made to effect the transfer of the permanent voice call path from the primary connection path to all or part of the secondary connection path in the event of failure of at least one node in the FRF.11 chain or the failure of the PVC connecting the nodes:

A. Configuration of each voice port as either a "master" voice port or "slave" voice port.

B. Configuration of an "ABCD" signaling bit pattern (as defined in FRF.11 Annex B) that represents an out-of-service state that may be transmitted by the VOPS voice-port to the PBX (VOPS OOS pattern Pv).

C. Configuration of an "ABCD" signaling bit pattern (as defined in FRF.11 Annex B) that represents an out-of-service state that may be transmitted by the PBX to the VOPS voice-port (PBX OOS pattern Pp).

D. Configuration of a timing interval (Tk) for the transmission of keep-alive FRF.11 Annex B signaling packets by VOPS voice-ports into the FRF.11 link. The FRF.11 specification defines this period as fixed at 5 seconds. In an embodiment of the present invention the user may configure this periodicity, but the embodiment is not so limited.

E. Configuration of an initial timeout period (Ti) from which to infer an initial failure condition in the event that FRF.11 Annex B (keep-alive) packets are not received.

F. Configuration of a subsequent timeout period (Ts) from which to infer a subsequent failure condition in the event that FRF.11 Annex B (keep-alive) packets are not received following a prior state in which FRF.11 Annex B packets were being received.

G. Configuration of a timing period (ToV) such that if the ABCD signaling bit pattern received from the PBX matches the PBX OOS pattern for this period, then an out of service condition is determined from the PBX H. Configuration of a timing period (ToV) such that if the ABCD signaling pattern received in the FRF.11 Annex B signaling packets matched the VOPS OOS pattern for this period, then an out of service condition is determined from the incoming FRF.11 network link.

The functionality of a master voice port of an embodiment is now described, but the embodiment is not so limited. The master voice port software logic of an embodiment tests the availability of the primary network connection path, for example VA1–VN1, at times comprising the time that the master voice port is configured to participate in a VOPS permanent voice call, the time that the VOPS system is restarted with such a configuration in force, with a user configured periodicity after initial configuration, and the time the system is restarted. The test for availability is based on the physical link state of the network connection VN1 and on the logical link state of VN1 based on the capabilities of the link protocol used, for example in the case of Frame Relay Forum FRF.11, the logical link state may be indicated by a Local Management Interface (LMI) protocol.

At approximately the same time that the master voice port checks the primary network connection path, the master voice port also checks for an out-of-service (OOS) condition being presented by the attached PBX. If the PBX interface is a digital interface such as T1 or E1, the master voice port will check the alarm status of the T1/E1 link as well as checking the ABCD signaling bit pattern being received from the PBX. If the ABCD signaling bit pattern does not match the criteria defined by the ABCD pattern "Pp" and the timing interval "Top" then the master voice port software logic will designate the link VA1-PBX as in-service.

If the primary connection path (VA1–VN1) is available and the VA1-PBX link is in service, the master port will commence transmission of keep-alive FRF.11 Annex B signaling packets into the FRF.11 network link with a periodicity as defined by "Tk". In this initial phase (Pi) or state of master voice port operation, while the master port is attempting to achieve connection with a far-end voice port, the master port may optionally suppress the transmission of voice packets containing audio signals from the voice-port.

The PVC link availability may be judged in part on an accounting of the bandwidth available on the PVC link such that the number of voice-calls allowed to use the PVC link does not exceed the bandwidth of the PVC or the fraction of the PVC bandwidth that is allocated for voice calls.

The master voice port will remain in the initial state until either the timer period Ti expires or at least one FRF.11 Annex B signaling packet is received from the voice port at the far end of the permanent connection.

In the event that the Ti timer period expires in the initial state, or the VA1–VN1 link is not available, the master voice port will select the first of the configured secondary connection links and repeat the above process. In the event that the first secondary connection link fails then subsequent secondary connection links will be tested until all secondary links have been tried. In the event that all links, primary and secondary, fail the master voice port will restart the process from the beginning. This process will be repeated indefinitely, but the embodiment is not so limited.

Once at least one FRF.11 Annex B signaling packet has been received from the far-end voice port, the master port enters a connected phase or state. In this state, transmission of voice packets may be enabled if they were previously disabled.

Subsequent to receiving at least one FRF.11 Annex B signaling packet, the master voice port of an embodiment will operate a timer monitoring the arrival of Annex B signaling packets or an equivalent. If a period greater than Ts expires in which no signaling packet has been received the master voice port software logic will perform the following actions, but the embodiment is not so limited:

A. If one or more secondary configurations are defined, the master voice port will switch connection into the secondary link and apply timer Ti and wait to receive a signaling packet from the far end. During this period, the master voice port may optionally continue to monitor the original primary connection in case one or more signaling packets arrive via the primary path. In this last case, the master voice port may switch connection back to the primary route. The master voice port may impose a minimum time (Tm) that must elapse, or a minimum signaling packet count (Cm), before switching back to the primary path.

B. If the first selected secondary connection does not receive a signaling packet within period Ti, then the next available secondary connection will be selected, but the embodiment is not so limited. This process will be repeated until a signaling packet is received. At this stage the master voice port will return to the connected state. The master voice port may continue to monitor the primary path connection and switch back to using the primary route should one or more signaling packets be received via the primary path.

C. In a situation where both voice ports at both ends of the link are configured as master ports, the values of Ti and Ts are chosen to be different such that the timing periods cause the two master ports to search the possible connection paths at a different rate. This guarantees that the two master ports will eventually attempt connection via the same path and if the path is functional, they will achieve re-connection. A simple algorithm used in an embodiment to select the relative timing periods sets the two timers Ti-1 and Ti-2 such that:

Ti-1=Ti-2\* number of possible connection paths, and sets the two timers Ts-1 and Ts-2 such that:

Ti-1=Ts-2\* number of possible connection paths.

In this manner the master port (−1) affected by Ti-1/Ts-1 remains committed to the same connection path long enough that the master port (−2) has sufficient time to attempt connection via all available paths.

In the period that the master port is not receiving signaling packets from the far end, it will assert the signaling ABCD pattern defined as Pv to the PBX to indicate an out-of-service condition to the PBX.

The functionality of a slave voice port of an embodiment is now described, but the embodiment is not so limited. The slave voice port of an embodiment operates according to the same rules as the master voice port with the exception that it does not transmit any data packets to the voice-over-packet network over a specific PVC until it has first received a signal packet from that PVC. The slave port of an embodiment has a "speak only when spoken to" behavior, but the embodiment is not so limited.

A slave port operates such that during the initial state, no packets are transmitted until first a signaling packet is received. At the point that the timer Ts has elapsed during which no signaling packets are received, the slave port ceases transmission of all packets. The slave remains in the mute state until it starts to receive signaling packets again via some path.

With reference to FIGS. 18 and 19, the voice port VA1 is configured as a master voice port and the voice ports VC1 and VC2 are configured as slave ports. This allows both ports VC1 and VC2 to have potential connections configured to the same master port VA1 and ensure that only one port, either VC1 or VC2, will be sending packets at any one time. This arrangement allows the secondary port VC2 to operate in a standby state where it does not send any packets until it first receives packets, such that in the event of the failure of voice port VC1, the master port VA1 will switch from its primary path that connects to VC1 into the secondary path that connects into VC2. The action by the master port of switching its connection from VC1 to VC2 will cause VC2 to start receiving packets and so exit from its mute state.

Figure 20:
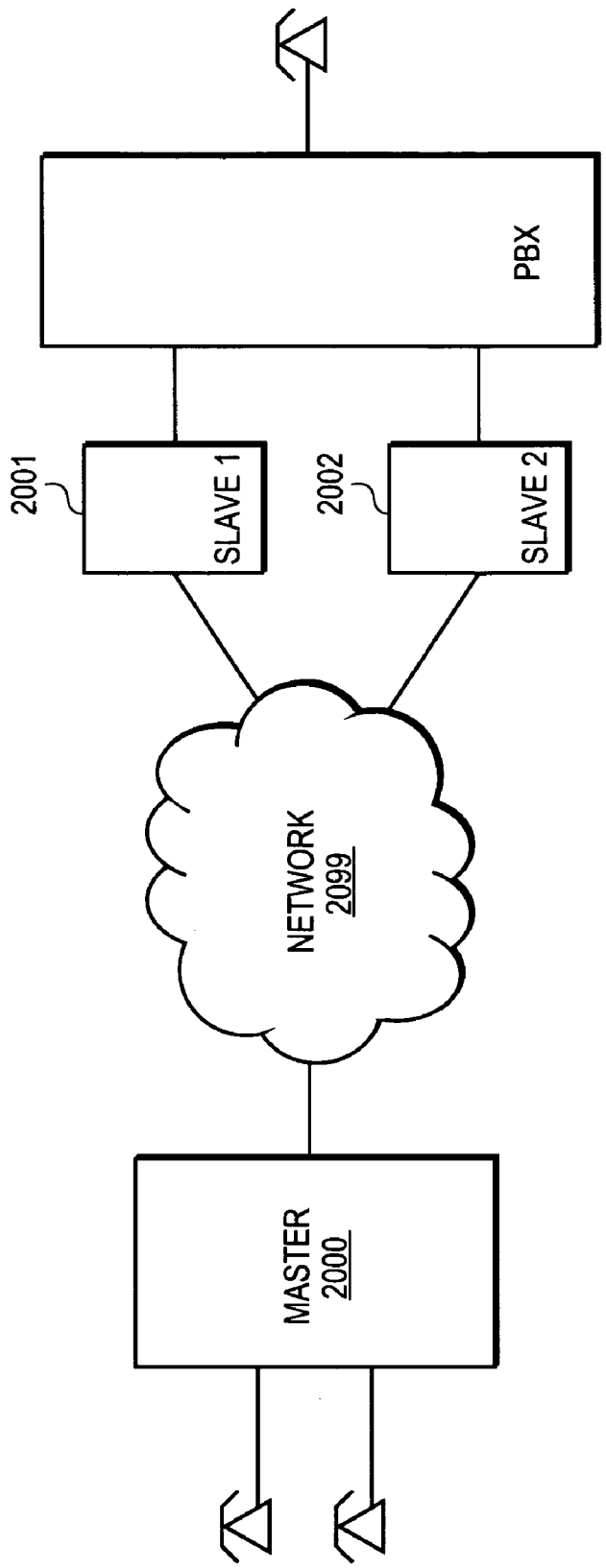
FIG. 20 is a configuration of an embodiment of the present invention in which a master voice port shares two slave voice ports over a network.
Figure 21:
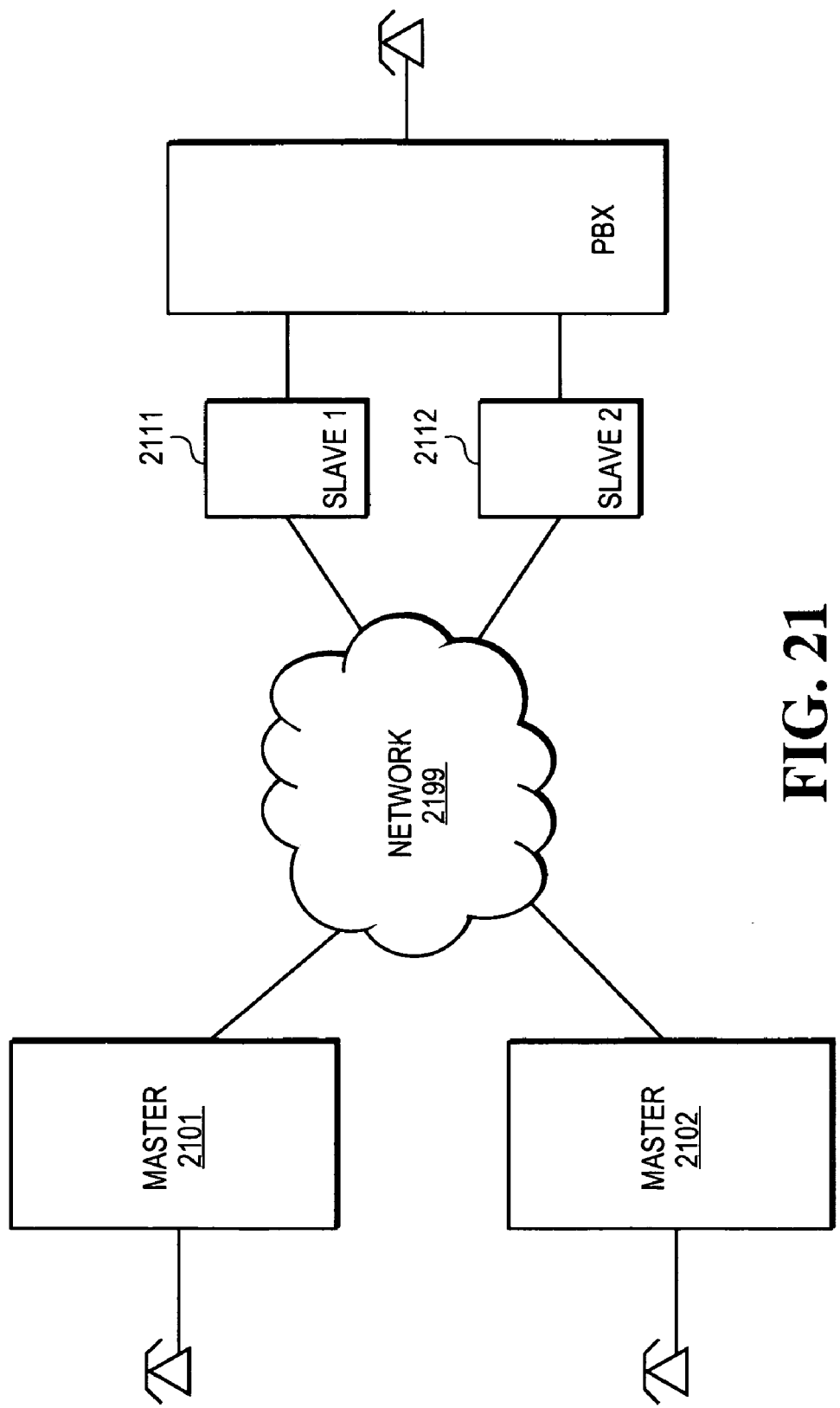
FIG. 21 is a configuration of an embodiment of the present invention in which two master voice ports share two slave voice ports over a network.

In an embodiment of the present invention, a master voice port may share more than one slave voice port, but the embodiment is not so limited. Furthermore, more than one master voice port may share more than one slave voice port, but the embodiment is not so limited. FIG. 20 is a configuration of an embodiment of the present invention in which a master voice port 2000 shares two slave voice ports 2001 and 2002 over a network 2099. FIG. 21 is a configuration of an embodiment of the present invention in which two master voice ports 2101 and 2102 share two slave voice ports 2111 and 2112 over a network 2199.

An intermediate node "N" may be described in terms of having P paths available connecting it to the previous node "N−1" and Q paths connecting it to the next node "N+1", but the embodiment is not so limited. In each direction in the node chain (e.g. from N to N−1 and from N to N+1), one connection path is designated as the primary or default path (referred to herein as P1 and Q1), and the other P−1, Q−1 paths are designated as secondary paths with a configured order of precedence. The intermediate node of an embodiment has the following behavior and configuration with respect to each direction in the node chain (N to N−1 and N to N+1), but the embodiment is not so limited:

A. An initial timer interval T-Ii

B. A secondary timer interval T-Is

C. A connection timer for each path

When the first incoming signaling packet is received from one direction in the node chain (for example from N−1 to N), the connection path over which the packet is received is designated as the active path for that connection direction (from N back to N−1). The packet is then forwarded to the path that is designated as active for the onward direction (e.g. N to N+1). If no path is designated as active, then the path designated as primary is used.

At the time that a signaling packet is forwarded, the connection timer for that path is set to zero. If no signaling packet is received back via the active path before the connection timer exceeds the initial timer period T-Ii, the active path designation is moved to the next available path in the defined precedence order. This process is repeated until all available paths are tried, in precedence order, at which time the process is restarted from the path with highest precedence.

Once a signaling packet has been received via a particular path, the initial timer interval T-Ii is replaced with the secondary timer interval T-Is. If no signaling packets are received such that the connection timer exceeds the T-Is interval, the active path designation is moved to the next available path as described above.

In an alternate embodiment, intermediate nodes may be designated with the master attribute. A master intermediate node keeps a copy of the most recent signaling packet that it has transmitted in each direction. At the time that a path is newly designated as the active path as a result of having just received a signaling packet via that path, the master node immediately sends a copy of the most recently sent signaling packet via that path. This action helps stabilize the path selection between the master intermediate node and the next node in the chain. For example it reduces the probability of rapid path switching (thrashing) that may occur if both nodes at opposite ends of a link attempt to send packets to each other via different paths. An intermediate node without the master attribute is considered to be a slave intermediate node.

Slave and master intermediate nodes of an embodiment may be configured to optionally discard duplicate signaling packets, but the embodiment is not so limited. A duplicate FRF.11 signaling packet can be detected if the following two criteria are met:

A. The packet is identical to the most recent packet received including sequence number.

B. The 30 ABCD 4-bit signaling samples contained in the signaling packet are not all the same.

(The FRF.11 specification expects that if a packet has a duplicate sequence number, then all ABCD 4-bit signaling samples within the packet should be the same, indicating that the signaling state for the voice connection has not recently changed).

A link chain with improved node-to-node path stability can be created by alternating master and slave nodes along the length of the chain. Avoiding unnecessary instability in the link chain may help reduce jitter.

The operation flow for intermediate nodes of an embodiment establishes that if a signaling packet is received via a path from one direction, and the link node is a master, make a copy of the packet for that direction and reset the connection timer to zero for that path, but the embodiment is not so limited. If the path is not the active path for the corresponding direction then assign active status to that path and, if the link node has the master, send a copy of the latest packet made for the opposite direction. During the time that no packets are being received, increment a timer for each active connection path. If the timer exceeds the T-Ii or T-Is timer interval as appropriate, transfer the active path attribute to the next path in precedence order.

The invention has been described in conjunction with the preferred embodiment. Although the present invention has been described with reference to specific exemplary embodiments, it will be evident that various modifications and changes may be made to these embodiments without departing from the broader spirit and scope of the invention as set forth in the claims. The present invention has been described with reference to signaling packets. All other packet types for the connections described herein follow the same connection path as the signaling packets but do not otherwise affect the operation of the connection. Accordingly, the specification and drawings are to be regarded in an illustrative rather than a restrictive sense.

What is claimed is:

1. A method for fault tolerant permanent voice calls in a voice over packet-data-network system (VOPS), comprising the steps of:

setting up at least one permanent voice call by coupling a plurality of nodes in series using a voice-over-packet protocol;

detecting a failure of at least one of the plurality of nodes;

automatically re-establishing the at least one permanent voice call connection using at least one alternate intermediate node and at least one alternate end-point node;

defining at least one set of primary connection bindings for a permanent voice call between a first and a second port;

defining at least one set of alternate connection bindings for the permanent voice call;

generating at least one preference-based list comprising the at least one set of alternate connection bindings;

determining at least one out-of-service state for at least one node, a determination made by the at least one node;

establishing a reconnection relationship between at least one node on either side of at least one out-of-service node; and reconnecting the permanent voice call using one of the at least one set of alternate connection bindings.

2. The method of claim 1, further comprising the step of transmitting the permanent voice call over a Frame Relay network in accordance with a standard comprising a Frame Relay Forum FRF.11 Implementation Agreement.

3. The method of claim 2, wherein the step of determining at least one out-of-service state for at least one node comprises the steps of:

configuring a first signaling bit pattern to represent an out-of-service state transmitted by at least one voice port to at least one private branch exchange;

configuring a second signaling bit pattern to represent an out-of-service state transmitted by the at least one private branch exchange to the at least one voice port;

configuring a timing interval for transmission of keep-alive FRF.11 signaling packets by the at least one voice port into at least one FRF.II connection, wherein the timing interval is user configurable;

configuring an initial timeout period to infer an initial failure in the absence of receipt of FRF.II signaling packets;

configuring a subsequent timeout period to infer a subsequent failure in an absence of receipt of FRF.II signaling packets following a prior state in which FRF.II signaling packets are received;

configuring a first timing period, wherein an out-of-service condition is determined from the at least one voice port when the first signaling bit pattern matches a VOPS out-of-service pattern; and configuring a second timing period, wherein an out-of-service condition is determined from the at least one private branch exchange when the second signaling bit pattern matches a private branch exchange out-of-service pattern.

4. The method of claim 3, wherein the step of establishing a reconnection relationship comprises the steps of:

configuring a first node on a first side of at least one out-of-service node as a master node; and configuring a second node on a second side of the at least one out-of-service node as a slave node.

5. The method of claim 4, wherein the master node comprises an initial state and a connected state of operation.

6. The method of claim 5, wherein the initial state of operation comprises the steps of:

determining availability of a primary network connection path based on a physical link state and a logical link state of the primary connection bindings;

determining an out-of-service condition presented by a private branch exchange; monitoring for expiration of the initial timeout period;

transmitting keep-alive FRF.11 signaling packets using the primary network connection path;

monitoring for receipt of at least one FRF.11 signaling packet from a terminal voice port via the primary network connection path; connecting to the slave node; and placing the master node in the connected state.

7. The method of claim 6, wherein when the initial timeout period is determined to be expired or when the primary network connection path is determined to be unavailable, an initial phase of operation comprises the steps of:

selecting an alternate network connection path from the at least one set of alternate connection bindings;

determining availability of the alternate network connection path based on a physical link state and a logical link state of a selected set of alternate connection bindings;

transmitting keep-alive FRF.11 signaling packets using the alternate i network connection path;

monitoring for receipt of at least one FRF.11 signaling packet from the terminal voice port via the alternate network connection path;

determining an out-of-service condition presented by the private branch exchange;

connecting to the slave node; and placing the master node in the connected state.

8. The method of claim 4, wherein the slave node:

operates in a mute state until at least one FRF.11 signaling packet is received from the master node; and transmits at least one slave node FRF.11 signaling packet in response to receipt of the at least one FRF.11 signaling packet from the master node.

9. The method of claim 6, wherein upon the receipt of at least one FRF.11 signaling packet from a terminal voice port via the primary network connection path an initial phase of operation comprises the steps of:

monitoring for expiration of the subsequent timeout period;

selecting an alternate network connection path from the at least one set of alternate connection bindings in response to a determined expiration of the subsequent timeout period;

switching connection from the primary network connection path to the selected alternate network connection path;

monitoring for expiration of the initial timeout period;

monitoring for receipt of at least one FRF.11 signaling packet from the terminal voice port via the alternate network connection path;

selecting a next preferred alternate network connection path from the at least one set of alternate connection bindings in response to a determined expiration of the initial timeout period in the absence of receipt of the at least one FRF.11 signaling packet over the alternate network connection path; connecting to the slave node; and placing the master node in the connected state.

10. The method of claim 9, further comprising the steps of:

continuing to monitor the primary network connection path for a receipt of at least one FRF.11 signaling packet upon selection of any alternate network connection path; and selecting the primary network connection path upon receipt of at least one FRF.11 signaling packet via the primary network connection path.

11. The method of claim 1, wherein the at least one node comprises at least one end-point node and at least one intermediate node.

12. The method of claim 11, further comprising the step of configuring at least one node between the first and the second ports as the at least one intermediate node, wherein the step of configuring comprises the steps of:

receiving a first signaling packet at the at least one intermediate node from a first direction via a first connection path;

designating the first connection path as an active path for the first direction;

forwarding the first signaling packet to an active path for a second direction;

setting a second active path connection timer to zero;

changing the active path for a second direction to at least one next available path according to a predefined path precedence order in response to the second active path connection timer exceeding an initial timer period prior to receipt of a second signaling packet via the active path for a second direction;

replacing the initial timer period with a secondary timer period in response to receipt of the second signaling packet via the active path for a second direction;

changing the active path for a second direction to the at least one next available path according to the predefined path precedence order in response to the second active path connection timer exceeding the secondary timer period.

13. The method of claim 1, wherein the first port is on a first private branch exchange and the second port is on a second private branch exchange.

14. The method of claim 1, wherein elements of the at least one set of primary connection bindings overlap with elements of the at least one set of alternate connection bindings.

15. The method of claim 1, wherein the step of defining at least one set of primary connection bindings comprises the steps of:

binding at least one voice port to at least one network interface; selecting at least one data permanent virtual circuit (PVC);

creating the at least one data PVC within the at least one network interface;

selecting a permanent call connection protocol; and establishing a connection with at least one Frame Relay network.

16. The method of claim 15, further comprising the step of selecting at least one sub-channel within the at least one data PVC.

17. The method of claim 15, further comprising the step of forming at least one intermediate forwarding connection, wherein the step of forming at least one intermediate forwarding connection comprises the steps of:

selecting a first data PVC in at least one intermediate node;

creating the first data PVC within a first network interface;

selecting a second data PVC in the at least one intermediate node;

creating the second data PVC within a second network interface;

binding the first data PVC and the second data PVC; and forming a bi-directional forwarding link, wherein packets arriving at the first network interface are forwarded to the second network interface.

18. The method of claim 17, further comprising the steps of:

selecting a first sub-channel within the first data PVC;

selecting a second sub-channel within the second data PVC; and binding the first sub-channel and the second sub-channel.

19. The method of claim 15, wherein the step of defining at least one set of alternate connection bindings comprises the steps of:

binding the at least one voice port to at least one alternate network interface;

selecting at least one alternate data permanent virtual circuit (PVC);

creating the at least one alternate data PVC within the at least one alternate network interface;

selecting the permanent call connection protocol; and establishing the connection with the at least one Frame Relay network.

20. The method of claim 19, further comprising the step of selecting at least one alternate sub-channel within the at least one alternate data PVC.

21. The method of claim 19, further comprising the step of forming at least one alternate intermediate forwarding connection, wherein the step of forming at least one alternate intermediate forwarding connection comprises the steps of:

selecting a third data PVC in at least one alternate intermediate node; creating the third data PVC within a third network interface;

selecting a fourth data PVC in the at least one alternate intermediate node;

creating the fourth data PVC within a fourth network interface; binding the third data PVC and the fourth data PVC; and forming a bi-directional forwarding link, wherein packets arriving at the third network interface are forwarded to the fourth network interface.

22. The method of claim 21, further comprising the steps of:

selecting a third sub-channel within the third data PVC;

selecting a fourth sub-channel within the fourth data PVC; and binding the third sub-channel and the fourth sub-channel.

23. The method of claim 2, wherein the voice over packet-data-network system (VOPS) comprises Asynchronous Transfer Mode (ATM), Frame Relay, High-level Data Link Control (HDLC), Internet Protocol (IP), and Time Division Multiplex (TDM) networks.

24. An apparatus for fault tolerant permanent voice calls in a voice over packet-data-network system (VOPS), the apparatus comprising:

at least one processor;

at least one input coupled to the at least one processor, the at least one input capable of receiving a permanent voice call, the processor configured to control the apparatus to provide fault tolerant permanent voice calls by, setting up at least one permanent voice call by coupling a plurality of nodes in series using a voice-over-packet protocol;

detecting a failure of at least one of the plurality of nodes;

automatically re-establishing the at least one permanent voice call connection using at least one alternate intermediate node and at least one alternate end-point node;

at least one output coupled to the at least one processor, the at least one output capable of providing the permanent voice call, wherein the processor is further configured to control the apparatus to provide fault tolerant permanent voice calls by:

defining at least one set of primary connection bindings for a permanent voice call between a first and a second port;

defining at least one set of alternate connection bindings for the permanent voice call;

generating at least one preference-based list comprising the at least one set of alternate connection bindings;

determining at least one out-of-service state for at least one node, a determination made by the at least one node;

establishing a reconnection relationship between at least one node on either side of at least one out-of-service node; and reconnecting the permanent voice call using one of the at least one set of alternate connection bindings.

25. The apparatus of claim 24, wherein the processor is further configured to control the apparatus to provide fault tolerant permanent voice calls by transmitting the permanent voice call over a Frame Relay network in accordance with a standard comprising a Frame Relay Forum FRF.11 Implementation Agreement.

26. The apparatus of claim 25, wherein determining at least one out-of-service state for at least one node comprises:

configuring a first signaling bit pattern to represent an out-of-service state transmitted by at least one voice port to at least one private branch exchange;

configuring a second signaling bit pattern to represent an out-of-service state transmitted by the at least one private branch exchange to the at least one voice port;

configuring a timing interval for transmission of keep-alive FRF.11 signaling packets by the at least one voice port into at least one FRF.11 connection, wherein the timing interval is user configurable;

configuring an initial timeout period to infer an initial failure in an absence of receipt of FRF.11 signaling packets;

configuring a subsequent timeout period to infer a subsequent failure in the absence of receipt of FRF.11 signaling packets following a prior state in which FRF.11 signaling packets are received;

configuring a first timing period, wherein an out-of-service condition is determined from the at least one voice port when the first signaling bit pattern matches a VOPS out-of-service pattern; and configuring a second timing period, wherein an out-of-service condition is determined from the at least one private branch exchange when the second signaling bit pattern matches a private branch exchange out-of-service pattern.

27. The apparatus of claim 26, wherein establishing a reconnection relationship comprises:

configuring a first node on a first side of at least one out-of-service node as a master node; and configuring a second node on a second side of the at least one out-of-service node as a slave node.

28. The apparatus of claim 27, wherein the master node comprises an initial state and a connected state of operation.

29. The apparatus of claim 27, wherein the initial state of operation 2 comprises:

determining availability of a primary network connection path based on a physical link state and a logical link state of the primary connection bindings;
determining an out-of-service condition presented by a private branch exchange;
monitoring for expiration of the initial timeout period;
transmitting keep-alive FRF.11 signaling packets using the primary network connection path;
monitoring for receipt of at least one FRF.11 signaling packet from a terminal voice port via the primary network connection path; connecting to the slave node; and
placing the master node in the connected state.

30. The apparatus of claim 29, wherein when the initial timeout period is determined to be expired or when the primary network connection path is determined to be unavailable, an initial phase of operation comprises:
selecting an alternate network connection path from the at least one set of alternate connection bindings;
determining availability of the alternate network connection path based on a physical link state and a logical link state of a selected set of alternate connection bindings;
transmitting keep-alive FRF.11 signaling packets using the alternate network connection path;
monitoring for receipt of at least one FRF.11 signaling packet from the terminal voice port via the alternate network connection path;
determining an out-of-service condition presented by the private branch exchange;
connecting to the slave node; and
placing the master node in the connected state.

31. The apparatus of claim 27, wherein the slave node:
operates in a mute state until at least one FRF.11 signaling packet is received from the master node; and
transmits at least one slave node FRF.11 signaling packet in response to receipt of the at least one FRF.11 signaling packet from the master node.

32. The apparatus of claim 29, wherein upon the receipt of at least one FRF.II signaling packet from a terminal voice port via the primary network connection path an initial phase of operation comprises:
monitoring for expiration of the subsequent timeout period;
selecting an alternate network connection path from the at least one set of alternate connection bindings in response to a determined expiration of the subsequent timeout period;
switching connection from the primary network connection path to the selected alternate network connection path;
monitoring for expiration of the initial timeout period;
monitoring for receipt of at least one FRF.II signaling packet from the terminal voice port via the alternate network connection path;
selecting a next preferred alternate network connection path from the at least one set of alternate connection bindings in response to a determined expiration of the initial timeout period in the absence of receipt of the at least one FRF.II signaling packet over the alternate network connection path; connecting to the slave node; and
placing the master node in the connected state.

33. The apparatus of claim 32, wherein the processor is further configured to control the apparatus to provide fault tolerant permanent voice calls by:

continuing to monitor the primary network connection path for a receipt of at least one FRF.II signaling packet upon selection of any alternate network connection path; and
selecting the primary network connection path upon receipt of at least one FRF.II signaling packet via the primary network connection path.

34. The apparatus of claim 24, wherein the at least one node comprises at least one end-point node and at least one intermediate node, wherein elements of the at least one set of primary connection bindings overlap with elements of the at least one set of alternate connection bindings.

35. The apparatus of claim 34, wherein the processor is further configured to control the apparatus to provide fault tolerant permanent voice calls by configuring at least one node between the first and the second ports as the at least one intermediate node, wherein configuring comprises:
receiving a first signaling packet at the at least one intermediate node, from a first direction via a first connection path;
designating the first connection path as an active path for the first direction;
forwarding the first signaling packet to an active path for a second direction;
setting a second active path connection timer to zero;
changing the active path for a second direction to at least one next available path according to a predefined path precedence order in response to the second active path connection timer exceeding an initial timer period prior to receipt of a second signaling packet via the active path for a second direction;
replacing the initial timer period with a secondary timer period in response to receipt of the second signaling packet via the active path for a second direction;
changing the active path for a second direction to the at least one next available path according to the predefined path precedence order in response to the second active path connection timer exceeding the secondary timer period.

36. The apparatus of claim 24, wherein defining at least one set of primary connection bindings comprises:
binding at least one voice port to at least one network interface; selecting at least one data permanent virtual circuit (PVC);
creating the at least one data PVC within the at least one network interface;
selecting a permanent call connection protocol; and
establishing a connection with at least one Frame Relay network.

37. The apparatus of claim 36, wherein the processor is further configured to control the apparatus to provide fault tolerant permanent voice calls by selecting at least one sub-channel within the at least one data PVC.

38. The apparatus of claim 29, wherein the processor is further configured to control the apparatus to provide fault tolerant permanent voice calls by forming at least one intermediate forwarding connection, wherein forming at least one intermediate forwarding connection comprises:
selecting a first data PVC in at least one intermediate node; creating the first data PVC within a first network interface;
selecting a second data PVC in the at least one intermediate node;
creating the second data PVC within a second network interface;
binding the first data PVC and the second data PVC; and forming a bi-directional forwarding link, wherein packets arriving at the first network interface are forwarded to the second network interface.

39. The apparatus of claim 38, wherein the processor is further configured to control the apparatus to provide fault tolerant permanent voice calls by:
selecting a first sub-channel within the first data PVC;
selecting a second sub-channel within the second data PVC; and
binding the first sub-channel and the second sub-channel.

40. The apparatus of claim 36, wherein defining at least one set of alternate connection bindings comprises:
binding the at least one voice port to at least one alternate network interface;
selecting at least one alternate data permanent virtual circuit (PVC);
creating the at least one alternate data PVC within the at least one alternate network interface;
selecting the permanent call connection protocol; and
establishing the connection with the at least one Frame Relay network.

41. The apparatus of claim 40, wherein the processor is further configured to control the apparatus to provide fault tolerant permanent voice calls by selecting at least one alternate sub-channel within the at least one alternate data PVC.

42. The apparatus of claim 40, wherein the processor is further configured to control the apparatus to provide fault tolerant permanent voice calls by forming at least one alternate intermediate forwarding connection, wherein forming at least one alternate intermediate forwarding connection comprises:
selecting a third data PVC in at least one alternate intermediate node;
creating the third data PVC within a third network interface;
selecting a fourth data PVC in the at least one alternate intermediate node;
creating the fourth data PVC within a fourth network interface; binding the third data PVC and the fourth data PVC; and
forming a bi-directional forwarding link, wherein packets arriving at the third network interface are forwarded to the fourth network interface.

43. The apparatus of claim 42, wherein the processor is further configured to control the apparatus to provide fault tolerant permanent voice calls by:
selecting a third sub-channel within the third data PVC;
selecting a fourth sub-channel within the fourth data PVC; and
binding the third sub-channel and the fourth sub-channel.

44. The apparatus of claim 24, wherein the voice over packet-data-network system (VOPS) comprises Asynchronous Transfer Mode (ATM), Frame Relay, High-level Data Link Control (HDLC), Internet Protocol (IP), and Time Division Multiplex (TDM) networks.

45. A computer readable medium containing executable instructions which, when executed in a Processing system, causes the system to perform the steps of a method for fault tolerant permanent voice calls in a voice over packet-data-network system (VOPS), the method comprising the steps of:
setting up at least one permanent voice call by coupling a plurality of nodes in series using a voice-over-packet protocol;
detecting a failure of at least one of the Plurality of nodes;
automatically re-establishing the at least one permanent voice call connection using at least one alternate intermediate node and at least one alternate end-point node;
defining at least one set of primary connection bindings for a permanent voice call between a first and a second port;
defining at least one set of alternate connection bindings for the permanent voice call;
generating at least one preference-based list comprising the at least one set of alternate connection bindings;
determining at least one out-of-service state for at least one node, a determination made by the at least one node;
establishing a reconnection relationship between at least one node on either side of at least one out-of-service node; and
reconnecting the permanent voice call using one of the at least one set of alternate connection bindings.

46. The computer readable medium of claim 45, wherein the method further comprises the step of transmitting the permanent voice call over a Frame Relay network in accordance with a standard comprising a Frame Relay Forum FRF.11 Implementation Agreement.

47. The computer readable medium of claim 46, wherein the step of determining at least one out-of-service state for at least one node comprises the steps of:
configuring a first signaling bit pattern to represent an out-of-service state transmitted by at least one voice port to at least one private branch exchange;
configuring a second signaling bit pattern to represent an out-of-service state transmitted by the at least one private branch exchange to the at least one voice port;
configuring a timing interval for transmission of keep-alive FRF.II signaling packets by the at least one voice port into at least one FRF.II connection, wherein the timing interval is user configurable;
configuring an initial timeout period to infer an initial failure in an absence of receipt of FRF.II signaling packets;
configuring a subsequent timeout period to infer a subsequent failure in the absence of receipt of FRF.II signaling packets following a prior state in which FRF.II signaling packets are received;
configuring a first timing period, wherein an out-of-service condition is determined from the at least one voice port when the first signaling bit pattern matches a VOPS out-of-service pattern; and
configuring a second timing period, wherein an out-of-service condition is determined from the at least one private branch exchange when the second signaling bit pattern matches a private branch exchange out-of-service pattern.

48. The computer readable medium of claim 47, wherein the step of establishing a reconnection relationship comprises the steps of:
configuring a first node on a first side of at least one out-of-service node as a master node; and
configuring a second node on a second side of the at least one out-of-service node as a slave node.

49. The computer readable medium of claim 48, wherein the master node comprises an initial state and a connected state of operation.

50. The computer readable medium of claim 49, wherein the initial state of operation comprises the steps of:
determining availability of a primary network connection path based on a physical link state and a logical link state of the primary connection bindings;

determining an out-of-service condition presented by a private branch exchange; monitoring for expiration of the initial timeout period;

transmitting keep-alive FRF.11 signaling packets using the primary network connection path;

monitoring for receipt of at least one FRF.11 signaling packet from a terminal voice port via the primary network connection path; connecting to the slave node; and placing the master node in the connected state.

51. The computer readable medium of claim 50, wherein when the initial timeout period is determined to be expired or when the primary network connection path is determined to be unavailable, an initial phase of operation comprises the steps of:

selecting an alternate network connection path from the at least one set of alternate connection bindings;

determining availability of the alternate network connection path based on a physical link state and a logical link state of the selected set of alternate connection bindings;

transmitting keep-alive FRF.11 signaling packets using the alternate network connection path;

monitoring for receipt of at least one FRF.11 signaling packet from the terminal voice port via the alternate network connection path;

determining an out-of-service condition presented by the private branch exchange;

connecting to the slave node; and placing the master node in the connected state.

52. The computer readable medium of claim 48, wherein the slave node:

operates in a mute state until at least one FRF.11 signaling packet is received from the master node; and transmits at least one slave node FRF.II signaling packet in response to receipt of the at least one FRF.11 signaling packet from the master node.

53. The computer readable medium of claim 50, wherein upon the receipt of at least one FRF.11 signaling packet from a terminal voice port via the primary network connection path an initial phase of operation comprises the steps of:

monitoring for expiration of the subsequent timeout period;

selecting an alternate network connection path from the at least one set of alternate connection bindings in response to a determined expiration of the subsequent timeout period;

switching connection from the primary network connection path to the selected alternate network connection path;

monitoring for expiration of the initial timeout period;

monitoring for receipt of at least one FRF.II signaling packet from the terminal voice port via the alternate network connection path;

selecting a next preferred alternate network connection path from the at least one set of alternate connection bindings in response to a determined expiration of the initial timeout period in the absence of receipt of the at least one FRF.II signaling packet over the alternate network connection path;

connecting to the slave node; and placing the master node in the connected state.

54. The computer readable medium of claim 53, wherein the method further comprises the steps of:

continuing to monitor the primary network connection path for a receipt of at least one FRF.11 signaling packet upon selection of any alternate network connection path; and selecting the primary network connection path upon receipt of at least one FRF.11 signaling packet via the primary network connection path.

55. The computer readable medium of claim 45, wherein elements of the at least one set of primary connection bindings overlap with elements of the at least one set of alternate connection bindings.

56. The computer readable medium of claim 45, wherein the step of defining at least one set of primary connection bindings comprises the steps of:

binding at least one voice port to at least one network interface; selecting at least one data permanent virtual circuit (PVC);

creating the at least one data PVC within the at least one network interface;

selecting a permanent call connection protocol; and establishing a connection with at least one Frame Relay network.

57. The computer readable medium of claim 56, wherein the method further comprises the step of selecting at least one sub-channel within the at least one data PVC.

58. The computer readable medium of claim 56, wherein the method further comprises the step of forming at least one intermediate forwarding connection, wherein the step of forming at least one intermediate forwarding connection comprises the steps of:

selecting a first data PVC in at least one intermediate node; creating the first data PVC within a first network interface;

selecting a second data PVC in the at least one intermediate node; creating the second data PVC within a second network interface; binding the first data PVC and the second data PVC; and forming a bi-directional forwarding link, wherein packets arriving at the first network interface are forwarded to the second network interface.

59. The computer readable medium of claim 58, wherein the method further comprises the steps of:

selecting a first sub-channel within the first data PVC;

selecting a second sub-channel within the second data PVC; and binding the first sub-channel and the second sub-channel.

60. The computer readable medium of claim 56, wherein the step of defining at least one set of alternate connection bindings comprises the steps of:

binding the at least one voice port to at least one alternate network interface;

selecting at least one alternate data permanent virtual circuit (PVC);

creating the at least one alternate data PVC within the at least one alternate network interface;

selecting the permanent call connection protocol; and establishing the connection with the at least one Frame Relay network.

61. The computer readable medium of claim 60, wherein the method further comprises the step of selecting at least one alternate sub-channel within the at least one alternate data PVC.

62. The computer readable medium of claim 60, wherein the method further comprises the step of forming at least one alternate intermediate forwarding connection, wherein the step of forming at least one alternate intermediate forwarding connection comprises the steps of:

selecting a third data PVC in at least one alternate intermediate node;

creating the third data PVC within a third network interface;

selecting a fourth data PVC in the at least one alternate intermediate node;

creating the fourth data PVC within a fourth network interface;

a binding the third data PVC and the fourth data PVC; and forming a bi-directional forwarding link, wherein packets arriving at the third network interface are forwarded to the fourth network interface.

63. The computer readable medium of claim 62, wherein the method further comprises the steps of:

selecting a third sub-channel within the third data PVC;

selecting a fourth sub-channel within the fourth data PVC; and binding the third sub-channel and the fourth sub-channel.

64. The computer readable medium of claim 45, wherein the method further comprises the step of configuring at least one node between the first and the second ports as the at least one intermediate node, wherein the step of configuring comprises the steps of:

receiving a first signaling packet at the at least one intermediate node from a first direction via a first connection path;

designating the first connection path as an active path for the first direction;

forwarding the first signaling packet to an active path for a second direction;

setting a second active path connection timer to zero;

changing the active path for a second direction to at least one next available path according to a predefined path precedence order in response to the second active path connection timer exceeding an initial timer period prior to receipt of a second signaling packet via the active path for a second direction;

replacing the initial timer period with a secondary timer period in response to receipt of the second signaling packet via the active path for a second direction;

changing the active path for a second direction to the at least one next available path according to the predefined path precedence order in response to the second active path connection timer exceeding the secondary timer period.

65. The computer readable medium of claim 45, wherein the voice over packet-data-network system (VOPS) comprises Asynchronous Transfer Mode (ATM), Frame Relay, High-level Data Link Control (HDLC), Internet Protocol 4 (IP), and Time Division Multiplex (TDM) networks.

* * * * *